(12) United States Patent
Minami

(10) Patent No.: US 8,108,114 B2
(45) Date of Patent: Jan. 31, 2012

(54) CLUTCH CONTROLLER, METHOD OF CONTROLLING CLUTCH, AND STRADDLE-TYPE VEHICLE

(75) Inventor: Kengo Minami, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 1014 days.

(21) Appl. No.: 12/036,096

(22) Filed: Feb. 22, 2008

(65) Prior Publication Data

US 2008/0208423 A1 Aug. 28, 2008

(30) Foreign Application Priority Data

Feb. 23, 2007 (JP) ................................. 2007-043645
Feb. 7, 2008 (JP) ................................ 2008-028132

(51) Int. Cl.
*F16H 61/00* (2006.01)

(52) U.S. Cl. .......................................... 701/67; 701/51

(58) Field of Classification Search .............. 701/66–68, 701/51, 53, 54, 55; 477/180, 70, 166, 86, 477/3–8, 14–17; 74/329, 330, 333, 335, 74/339

See application file for complete search history.

(56) References Cited

U.S. PATENT DOCUMENTS 6,754,574 B2 * 6/2004 Tokura et al. .................. 701/67
7,507,182 B2 * 3/2009 Matsumura et al. ........... 477/174
7,678,020 B2 * 3/2010 Matsumura et al. ........... 477/174

FOREIGN PATENT DOCUMENTS

| DE | 10 2005 030 191 A1 | 2/2006 |
| DE | 10 2005 057 844 A1 | 6/2006 |
| DE | 10 2005 030 534 A1 | 1/2007 |
| EP | 1 617 058 A2 | 1/2006 |
| EP | 1 688 635 A1 | 8/2006 |
| JP | 2001-146930 | 5/2001 |
| WO | WO 03/019029 A1 | 3/2003 |

* cited by examiner

Primary Examiner — Dalena Tran

(74) Attorney, Agent, or Firm — Rabin & Berdo, PC

(57) ABSTRACT

A clutch controller that improves riding comfort when a clutch is engaged. A target torque obtaining section obtains torque that is supposed to be transmitted from a drive-side member of the clutch to a downstream mechanism in a torque transmission path as target transmission torque, the downstream mechanism including a driven-side member of the clutch. An clutch actuator control section actuates a clutch actuator based on the target transmission torque. The target torque obtaining section estimates torque to be transmitted from the drive-side member to the downstream mechanism after the drive-side member and the driven-side member are completely engaged, and obtains the estimated torque as the target transmission torque.

12 Claims, 12 Drawing Sheets

CLUTCH CONTROLLER, METHOD OF CONTROLLING CLUTCH, AND STRADDLE-TYPE VEHICLE

RELATED APPLICATIONS

This application claims the benefit of priority under 35 USC 119 of Japanese patent application no. 2007-043645, filed on Feb. 23, 2007, and Japanese patent application no. 2008-028132, filed on Feb. 7, 2008, which applications are hereby incorporated by reference in their entireties.

BACKGROUND OF THE INVENTION

1. Field of the Invention

The present invention relates to control of an engagement state of a clutch by actuating an actuator.

2. Description of Related Art

In a vehicle with a semi-automatic transmission that actuates an actuator to engage or disengage a clutch, the clutch is provided with a drive-side member (for example, a friction disk) that rotates upon receipt of rotational force from a driving source, and a driven-side member (for example, a clutch disk) that is pressed by the drive-side member to operate in conjunction with the drive-side member. The vehicle controls the engagement state of the clutch based on a difference in rotational speed between the drive-side and driven-side members (for example, JP-A-2001-146930). Generally, such vehicles control or gradually reduce the difference in rotational speed between the drive-side and driven-side members during engaging operation of the clutch.

The aforementioned conventional vehicle controls the engagement state of the clutch based on the difference in rotational speed during engaging operation of the clutch. This, however, can prevent appropriate torque from being constantly transmitted from the drive-side member to a downstream mechanism including the driven-side member, and thus can impair riding comfort. For example, when a half-clutch state is discontinued, torque transmitted to the driven-side member increases sharply, providing shocks to the vehicle. In order to solve this problem, another control method has been proposed, in which a half-clutch state is maintained until the difference in rotational speed is almost zero. However, such a control method can result in insufficient torque being continuously transmitted to the driven-side member over a long time period, which in turn may cause the vehicle to decelerate excessively.

SUMMARY OF THE INVENTION

The present invention addresses the foregoing problems and provides a clutch controller for a straddle-type vehicle that improves riding comfort when the clutch is engaged.

The present invention is directed to a clutch controller for controlling an engagement state of a clutch by actuating an actuator. A target torque obtaining means obtains torque that is supposed to be transmitted from a drive-side member of the clutch to a downstream mechanism in a torque transmission path as target transmission torque, the downstream mechanism including a driven-side member of the clutch. A control means actuates the actuator based on the target transmission torque. The target torque obtaining means estimates torque to be transmitted from the drive-side member to the downstream mechanism in the torque transmission path after the drive-side member and the driven-side member are completely engaged, and obtains the estimated torque as the target transmission torque.

The present invention is also directed to a straddle-type vehicle including a power source; a clutch for transmitting torque of the power source or interrupting transmission of the torque; and a clutch controller for controlling an engagement state of the clutch by actuating an actuator. The clutch controller includes a target torque obtaining means for obtaining torque that is supposed to be transmitted from a drive-side member of the clutch to a downstream mechanism in a torque transmission path as target transmission torque, the downstream mechanism including a driven-side member of the clutch; and a control means for actuating the actuator based on the target transmission torque. The target torque obtaining means estimates torque to be transmitted from the drive-side member to the downstream mechanism in the torque transmission path after the drive-side member and the driven-side member are completely engaged, and obtains the estimated torque as the target transmission torque.

The present invention is further directed to a method of controlling an engagement state of a clutch by actuating an actuator. The method includes estimating torque to be transmitted from a drive-side member of the clutch to a downstream mechanism in a torque transmission path after the drive-side member and a driven-side member of the clutch are completely engaged, the downstream mechanism including the driven-side member; obtaining the estimated torque as target transmission torque that is supposed to be transmitted from the drive-side member to the downstream mechanism in the torque transmission path; and actuating the actuator based on the target transmission torque.

The present invention minimizes abrupt changes in torque transmitted via the clutch when completely engaging the clutch, and thus improves riding comfort when the clutch is engaged. The straddle-type vehicle of the invention may be a motorcycle (including a scooter), a four-wheeled buggy, a snowmobile or a two-wheeled electric vehicle, for example.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
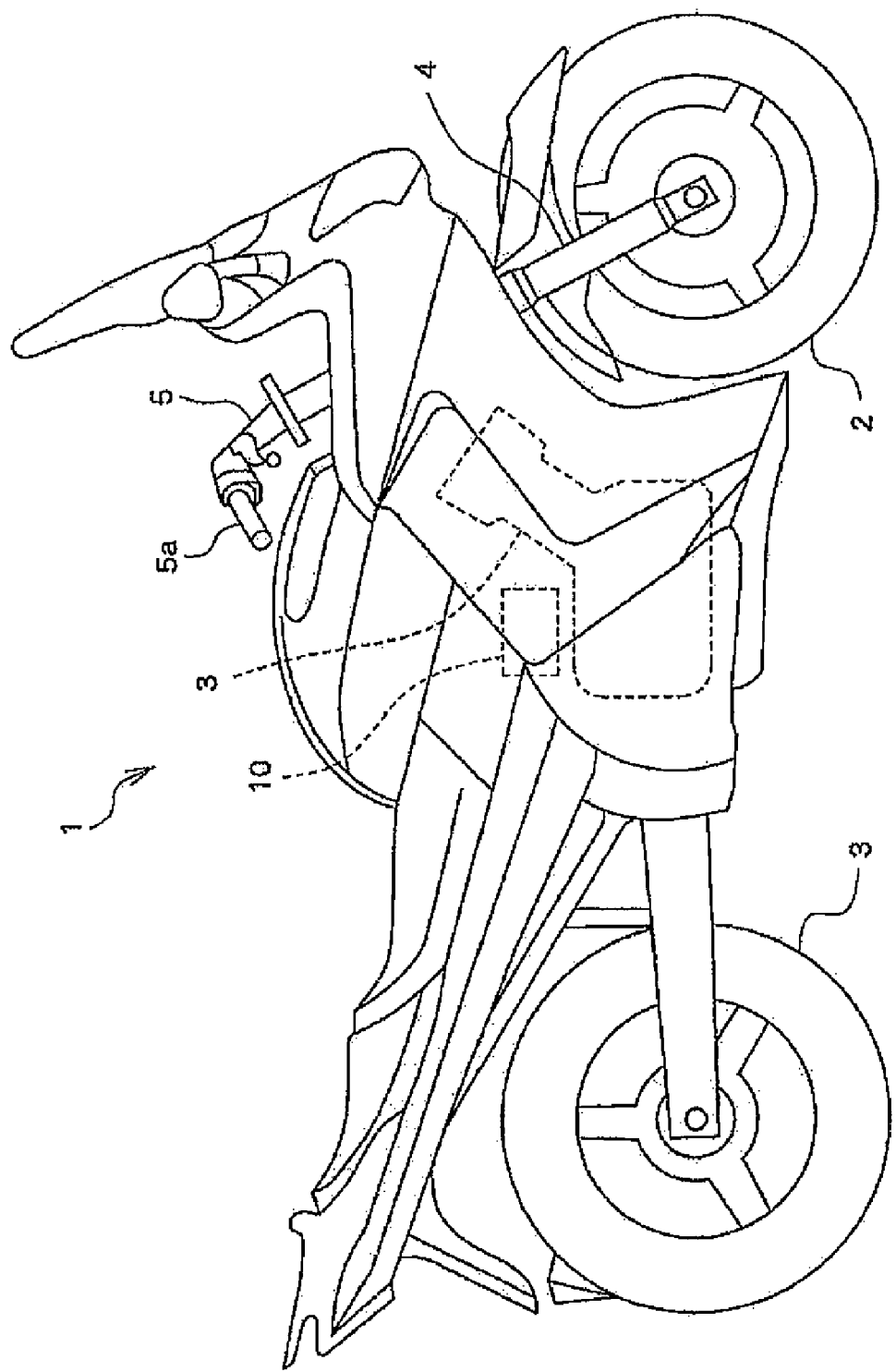
FIG. 1 is a side view of a motorcycle provided with a clutch controller according to an embodiment of the present invention.
Figure 2:
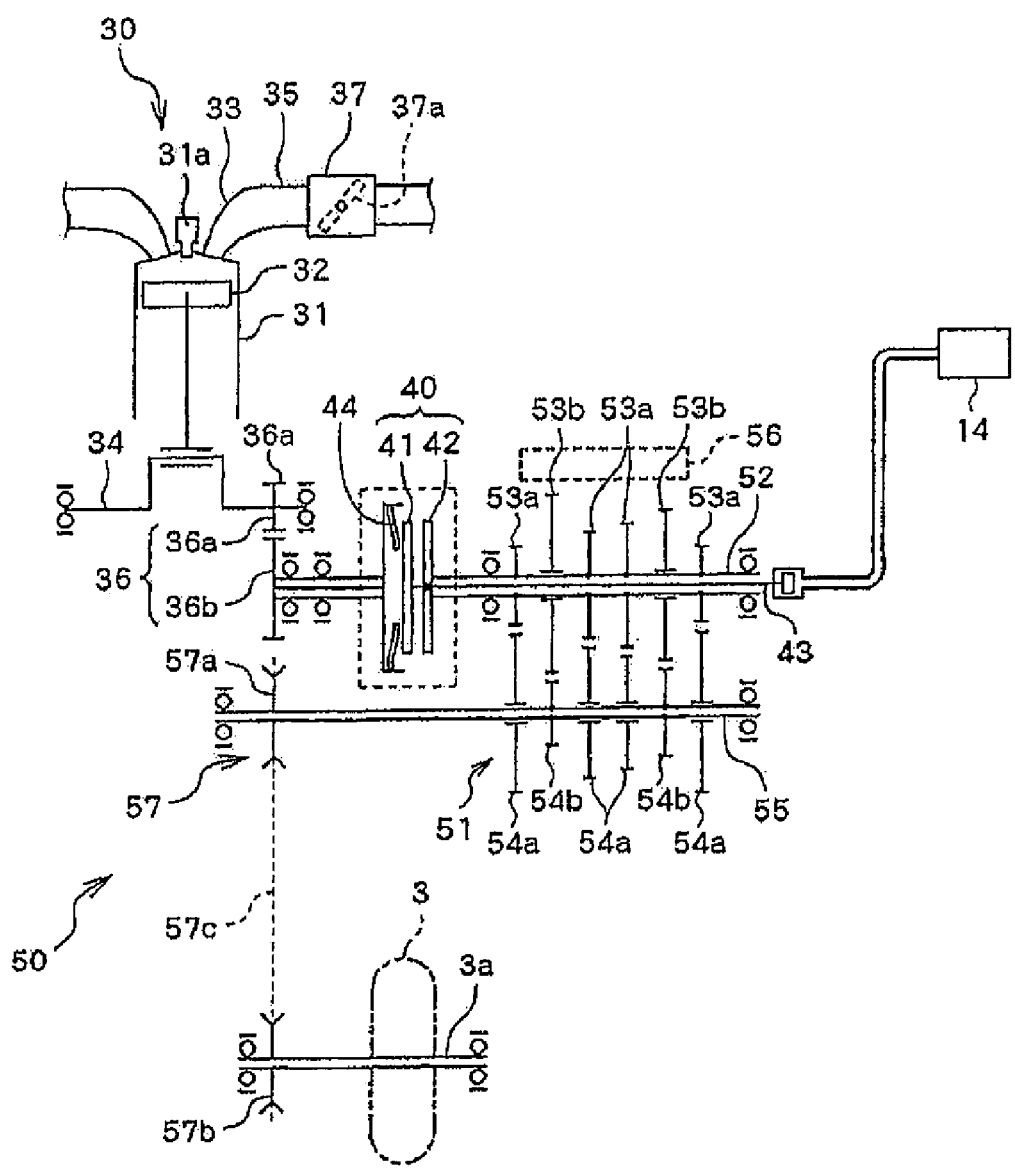
FIG. 2 is a schematic view of a mechanism provided on a torque transmission path of the motorcycle.

An embodiment of the present invention is now described with reference to the drawings. FIG. 1 is a side view of a motorcycle 1 provided with a clutch controller 10 as an exemplary embodiment of the invention. FIG. 2 is a schematic view of a mechanism provided on a torque transmission path of motorcycle 1.

As shown in FIGS. 1 and 2, in addition to clutch controller 10, motorcycle 1 comprises an engine 30, a primary speed reducing mechanism 36, a clutch 40, a secondary speed reducing mechanism 50, a front wheel 2 and a rear wheel 3.

Front wheel 2 is rotatably supported by lower ends of a front fork 4 extending vertically. Handlebars 5 are connected to the top of front fork 4. An accelerator grip 5a mounted to a right end of handlebars 5 is connected to a throttle valve 37a provided in a throttle body 37 (FIG. 2). Throttle valve 37a is rotated according to rider's accelerator operation, and a certain amount of air, which depends on the rotation amount of throttle valve 37a, is delivered to engine 30. Engine 30 outputs torque according to the rider's accelerator operation. Motorcycle 1 may be provided with an electronically-controlled throttle device. In this case, there are provided a sensor for detecting a rider's accelerator operation and an actuator for rotating throttle valve 37a according to the accelerator operation detected by the sensor.

As shown in FIG. 2, engine 30 has a cylinder 31, a piston 32, an intake port 33, and a crankshaft 34. Throttle body 37 is connected to intake port 33 via an intake pipe 35.

Throttle valve 37a is placed within an intake passage of throttle body 37. As described above, throttle valve 37a rotates according to the rider's accelerator operation, and a certain amount of air, which depends on the accelerator operation, is delivered from throttle body 37 to engine 30. A mixture of air and fuel supplied from a fuel supplier (for example, an injector or carburetor) is delivered to an interior of cylinder 31. Burning the air-fuel mixture causes piston 32 to reciprocate within cylinder 31. Reciprocating motion of piston 32 is converted into rotating motion by crankshaft 34, thereby outputting torque from engine 30.

Primary speed reducing mechanism 36 includes a drive-side primary reduction gear 36a that operates in conjunction with crankshaft 34; and a driven-side primary reduction gear 36b that meshes with primary reduction gear 36a. Primary speed reducing mechanism 36 decelerates rotation of engine 30 at a predetermined ratio.

Clutch 40 is a friction clutch, for example, and is provided with a drive-side member 41 and a driven-side member 42. Drive-side member 41 includes a friction disk, for example, and rotates together with drive-side primary reduction gear 36a. Driven-side member 42 includes a clutch disk, for example, and rotates together with a main shaft 52. Drive-side member 41 and driven-side member 42 are pressed against each other by elastic force of a clutch spring 44 at the time of engaging clutch 40, so that torque of engine 30 is transmitted from drive-side member 41 to driven-side member 42. When clutch 40 is disengaged, driven-side member 42 is moved away from drive-side member 41, so that torque transmission from drive-side member 41 is interrupted. Clutch 40 is engaged or disengaged by a clutch actuator 14 provided in clutch controller 10. More specifically, clutch actuator 14 presses a push rod 43, provided in the interior of main shaft 52, in the axial direction against the elastic force of clutch spring 44 or releases the pressed push rod 43, so that driven-side member 42 is moved away from drive-side member 41 to disengage clutch 40 or so that driven-side member 42 is pressed against drive-side member 41 to engage clutch 40.

Secondary speed reducing mechanism 50 decelerates rotation of main shaft 52 and transmits the decelerated rotation to an axle 3a of rear wheel 3. Secondary speed reducing mechanism 50 is provided with a gearbox 51 and a transmission mechanism 57. Gearbox 51 is a mechanism to change deceleration ratios, such as a constant-mesh gearbox and a selective-sliding gearbox.

Gearbox 51 has plural shift gears 53a (for example, first-speed, second-speed, third/fourth-speed gears) and shift gears 53b (for example, fifth-speed and six-speed gears) on main shaft 52. Gearbox 51 also has plural shift gears 54a (for example, first-speed, second-speed, third/fourth-speed gears) and shift gears 54b (for example, fifth-speed and sixth-speed gears) on a countershaft 55. Shift gears 53a are spline-connected to and operate in conjunction with main shaft 52. Shift gears 54a turn free to countershaft 55 and mesh with corresponding shift gears 53a. Shift gears 53b run idle with respect to main shaft 52. Shift gears 54b mesh with corresponding shift gears 53b and are spline-connected to and operate in conjunction with countershaft 55. A pair of the meshing shift gears 53a, 54a and a pair of the meshing shift gears 53b, 54b each have a different speed reduction ratio.

Gearbox 51 also comprises a gearshift mechanism 56. Gearshift mechanism 56 includes a shift fork and a shift drum, for example, and selectively moves shift gears 53a, 53b, 54a, 54b in the axial direction of main shaft 52 or countershaft 55. Gearshift mechanism 56 causes shift gears 53b, 54a, which run idle with respect to the corresponding shafts, to connect with adjacent shift gears 53a, 54b, which operate in conjunction with the corresponding shafts. This changes the pairs of shift gears to transmit torque from main shaft 52 to countershaft 55. Gearshift mechanism 56 is actuated by power inputted from a shift actuator 16.

Transmission mechanism 57 decelerates rotation of countershaft 55 and transmits the decelerated rotation to axle 3a of rear wheel 3. Transmission mechanism 57 includes a drive-side member 57a (for example, a drive-side sprocket) that operates in conjunction with countershaft 55; a driven-side member 57b (for example, a driven-side sprocket) that operates in conjunction with axle 3a; and a transmission member 57c (for example, a chain) that transmits torque from drive-side member 57a to driven-side member 57b.

Torque outputted from engine 30 is transmitted to drive-side member 41 of clutch 40 via primary speed reducing mechanism 36. Torque transmitted to drive-side member 41 is transmitted to axle 3a of rear wheel 3 via driven-side member 42, gearbox 51, and transmission mechanism 57, when clutch 40 is engaged or when drive-side member 41 and driven-side member 42 contact each other, that is, when clutch 40 is in a half-clutch state.

Figure 3:
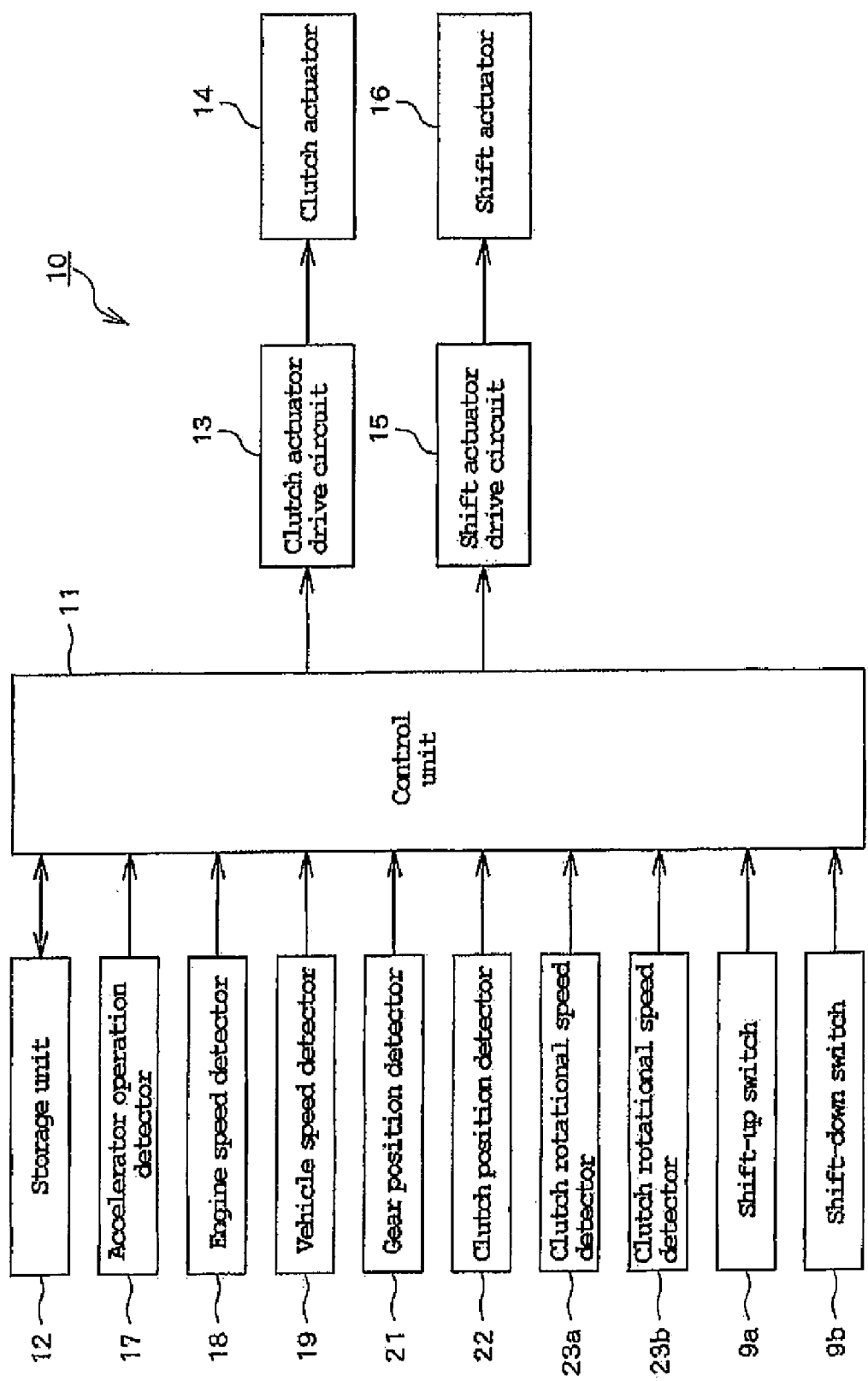
FIG. 3 is a block diagram of the clutch controller.

Clutch controller 10 is now described. Motorcycle 1 is a semi-automatic vehicle that changes the shift gears of gearbox 51 without the need for the rider to operate the clutch. The engagement state of clutch 40 (stroke of clutch 40) is controlled by clutch controller 10. FIG. 3 is a block diagram of clutch controller 10. As shown in FIG. 3, clutch controller 10 comprises a control unit 11, a storage unit 12, a clutch actuator drive circuit 13, a clutch actuator 14, a shift actuator drive circuit 15, a shift actuator 16, an accelerator operation detector 17, an engine speed detector 18, a vehicle speed detector 19, a gear position detector 21, a clutch position detector 22 and clutch rotational speed detectors 23a, 23b. Control unit 11 is connected to a shift-up switch 9a and a shift-down switch 9b.

Control unit 11 includes a central processing unit (CPU), and actuates clutch actuator 15 and shift actuator 16 in accordance with programs stored in storage unit 12 to control the engagement state of clutch 40 and the speed reduction ratios of gearbox 51. The processing executed by control unit 11 will be discussed in detail later.

Storage unit 12 includes a nonvolatile memory and a volatile memory, and holds in advance the programs executed by control unit 11. Storage unit 12 also holds tables and expressions to be used for processing executed by control unit 11. These tables and expressions will be discussed in detail later.

Clutch actuator drive circuit 13 outputs electric power to drive clutch actuator 14 in accordance with a signal inputted from control unit 11. Clutch actuator 14 includes, for example, a motor and a power transmission mechanism (such as hydraulic path and wire), and is driven by receiving electric power outputted from clutch actuator drive circuit 13. Clutch actuator 14 presses push rod 43 or releases the pressed push rod 43 to engage or disengage clutch 40. More specifically, clutch actuator 14 is capable of being actuated in the disengagement direction to disengage clutch 40 by pressing push rod 43 or in the engagement direction to engage clutch 40 by releasing the pressed push rod 43. Clutch actuator 14 causes clutch 40 to be in a half-clutch state in the process of the engaging operation in which clutch 40, which has been disengaged, is engaged. When clutch 40 is in a half-clutch state, only part of the torque of engine 30 is transmitted from drive-side member 41 to driven-side member 42.

Shift actuator drive circuit 15 outputs electric power to drive shift actuator 16 in accordance with a signal inputted from control unit 11. Shift actuator 16 includes, for example, a motor and a power transmission mechanism (such as hydraulic path and wire), and is driven by receiving electric power outputted from shift actuator drive circuit 15. Shift actuator 16 actuates gearshift mechanism 56 of gearbox 51 to change the pairs of shift gears to transmit torque from main shaft 52 to countershaft 55 in order to change the speed reduction ratios.

Accelerator operation detector 17 detected an amount of the accelerator operation by the rider (hereinafter referred to as accelerator displacement (for example, throttle opening)). Examples of accelerator operation detector 17 are a throttle position sensor mounted to throttle body 37 to detect a throttle opening and an accelerator position sensor mounted to accelerator grip 5a to detect a rotation angle of accelerator grip 5a. Accelerator operation detector 17 outputs an electric signal (hereinafter referred to as request torque signal) to control unit 11 according to accelerator displacement. Control unit 11 detects accelerator displacement by the rider based on the request torque signal.

Engine speed detector 18 detects rotational speed of engine 30 (hereinafter referred to as engine speed). Examples of engine speed detector 18 are a crank angle sensor for outputting a pulse signal with a frequency according to the rotational speed of crankshaft 34 or primary reduction gears 36a, 36b and a tachogenerator for outputting a voltage signal according to the rotational speed thereof. Engine speed detector 18 outputs a signal to control unit 11 according to engine speed. Control unit 11 calculates engine speed based on the input signal.

Vehicle speed detector 19 detects a vehicle speed, and outputs a signal (hereinafter referred to as vehicle speed signal) to control unit 11 according to, for example, the rotational speed of axle 3a of rear wheel 3 or countershaft 55. Control unit 11 calculates vehicle speed based on the vehicle speed signal. Vehicle speed detector 19 may output a signal to control unit 11 according to the rotational speed of main shaft 52 as a vehicle speed signal. In this case, control unit 11 calculates vehicle speed not only based on the input vehicle speed signal, but also based on speed reduction ratios of gearbox 51 and transmission mechanism 57.

Gear position detector 21 detects the positions of shift gears 53a, 53b, 54a, 54b provided movably in the axial direction of countershaft 55 or main shaft 52. An example of gear position detector 21 is a potentiometer mounted to gearshift mechanism 56 or shift actuator 16. Gear position detector 21 outputs a signal to control unit 11 according to the positions of shift gears 53a, 53b, 54a, 54b. Based on the input signal, control unit 11 detects that some of the shift gears 53a, 53b, 54a, 54b, which are associated with the gear shifting, have finished moving and the speed reduction ratios have changed already.

Clutch position detector 22 detects an engagement state of clutch 40. Examples of clutch position detector 22 are a potentiometer for outputting a signal according to the position of push rod 43 and a potentiometer for outputting a signal according to the position or rotation angle of the output shaft of clutch actuator 14. Based on the signal inputted from clutch position detector 22, control unit 11 detects the engagement state of clutch 40. In other words, control unit 11 detects the degree of contact between drive-side member 41 and driven-side member 42 (the distance between drive-side member 41 and driven-side member 42).

Clutch rotational speed detector 23a detects the rotational speed of drive-side member 41 of clutch 40. Examples of clutch rotational speed detector 23a are a rotary encoder for outputting a pulse signal with a frequency according to the rotational speed of drive-side member 41 and a tachogenerator for outputting a voltage signal according to the rotational speed of drive-side member 41. In turn, clutch rotational speed detector 23b detects the rotational speed of driven-side member 42 of clutch 40. Examples of clutch rotational speed detector 23b are a rotary encoder and a tachogenerator, as described for clutch rotational speed detector 23a.

Shift-up switch 9a and shift-down switch 9b allow the rider to provide instructions to change speed reduction ratios of gearbox 51 to clutch controller 11. Switches 9a, 9b output a signal to control unit 11 according to the instructions of gear shifting. Control unit 11 actuates shift actuator 16 according to the input signal to change the pairs of the shift gears to transmit torque from main shaft 52 to countershaft 55.

The control of clutch 40 by clutch controller 10 and the basic idea for such control is now described.

A conventional clutch controller controls the engagement state of the clutch based on the difference in rotational speed between the drive-side and driven-side members of the clutch. Technologies have been proposed to reduce the time period spent for the clutch engaging operation (from the point in time when the drive-side and driven-side members are apart from each other to the point in time when these members are pressed against each other), to improve riding comfort during the clutch engaging operation, and to reduce shocks and the deceleration feeling (see JP-A-2001-146930). However, there is a trade-off between reduction in time spent for the clutch engaging operation and improvement in riding comfort. This restricts the reduction in time period spent for clutch engaging operation. In other words, to engage the clutch in a short time period causes shocks to the vehicle, and on the other hand, to reduce the shocks requires a longer time period to engage the clutch.

The inventor focused attention not on the time period actually spent for engaging the drive-side member with the driven-side member, but on the clutch engagement time period as perceived by the rider. The inventor found that the rider perceives the clutch engagement time period due to deceleration of the vehicle caused by disengagement of the clutch, or a half-clutch state, as well as due to slight shocks generated when the drive-side and driven-side members are completely engaged. In other words, the rider perceives the time period from the point in time when the vehicle starts decelerating to the point in time when slight shocks are generated when the drive-side and driven-side members are completely engaged, as a time period spent for engaging the clutch. In addition, the inventor found that deceleration and shocks are caused by changes in torque transmitted from the drive-side member to the driven-side member of the clutch. More specifically, the vehicle decelerates with a decrease in torque transmitted from the drive-side member to the driven-side member, and shocks are generated with an increase in torque at the time when the drive-side and driven-side members are completely engaged.

Thus, clutch controller 10 obtains torque (hereinafter referred to as actual transmission torque Tac) transmitted from drive-side member 41 of clutch 40 to the downstream mechanism (hereinafter referred to as downstream transmission mechanism) in the torque transmission path including driven-side member 42, such as driven-side member 42 and secondary speed reducing mechanism 50. In addition, clutch controller 10 estimates torque to be transmitted to the downstream transmission mechanism after drive-side member 41 and driven-side member 42 are completely engaged. Then, clutch controller 10 defines the estimated torque as target transmission torque Ttg, and controls the engagement state of clutch 40 during engaging operation of clutch 40 (when clutch 40 is in a half-clutch state) such that actual transmission torque Tac approximates target transmission torque Ttg.

Figure 4:
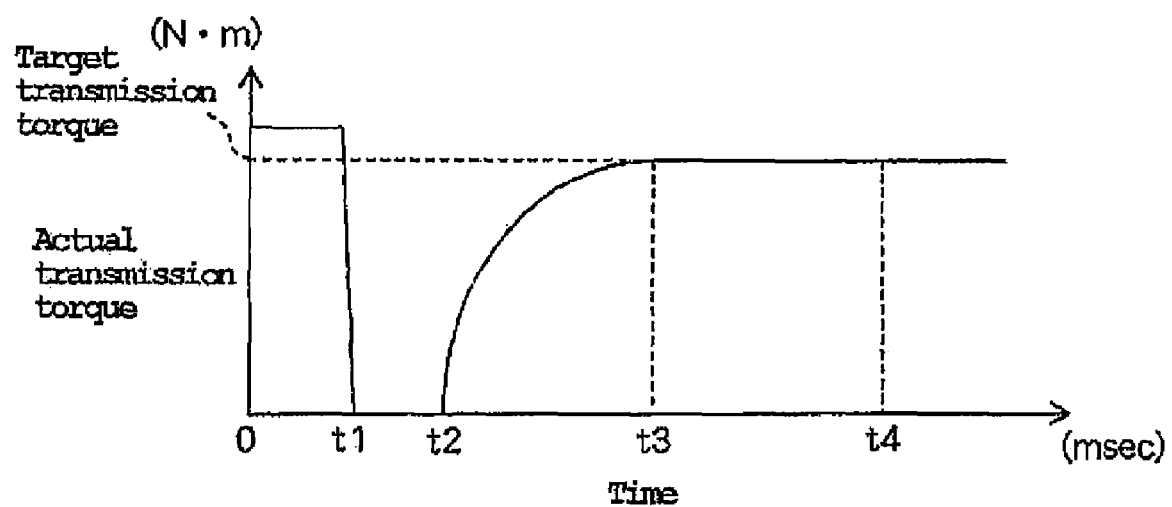
FIG. 4 is a graph showing changes in actual transmission torque with respect to time during engaging operation of a clutch.

Thereby, the actual transmission torque Tac is prevented from excessively decreasing during engaging operation of the clutch, thus reducing the vehicle deceleration feeling during the engaging operation. In addition, the actual transmission torque Tac is prevented from changing at the time when the clutch is completely engaged, thus reducing shocks generated at that time. Consequently, the rider perceives that it takes less time to engage the clutch. FIG. 4 is an explanatory view showing changes in actual transmission torque Tac with respect to time during engaging operation of clutch 40. At time t1, actual transmission torque Tac decreases to 0 temporarily because clutch 40 is disengaged. After that, clutch controller 10 estimates torque at the time when clutch 40 is completely engaged (at time t4 in FIG. 4) and defines the estimated torque as target transmission torque Ttg. At time t2, when clutch controller 10 starts actuating clutch 40 in the direction to engage clutch 40, clutch 40 is in a half-clutch state. When clutch 40 is in a half-clutch state, clutch controller 10 controls the engagement state of clutch 40 such that actual transmission torque Tac reaches target transmission torque Ttg. As a result of this control, at time t3, actual transmission torque Tac is equal to target transmission torque Ttg and corresponds with the torque to be obtained after completion of the clutch engagement. After that, clutch 40 is completely engaged at time t4, and thus the half-clutch state is discontinued. Because actual transmission torque Tac has been already equal to target transmission torque Ttg, the current actual transmission torque Tac is prevented from changing, thus reducing shocks to the vehicles. Up to this point, the basic idea for control of clutch 40 by clutch controller 10 has been discussed. Control of clutch 40 by clutch controller 10 is now described in detail.

Figure 5:
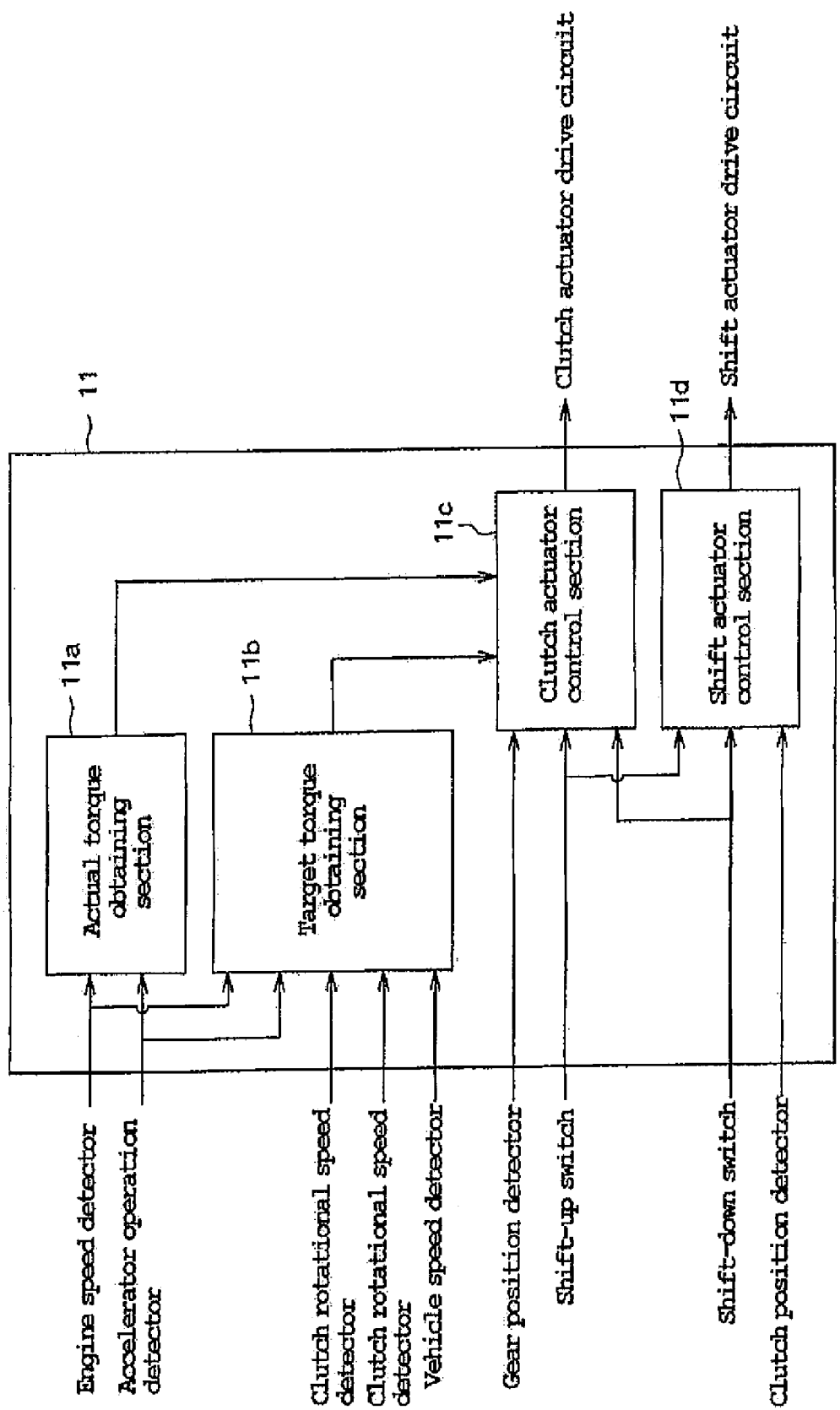
FIG. 5 is a block diagram illustrating functions of a control unit provided in the clutch controller.

FIG. 5 is a block diagram illustrating functions of control unit 11. The functions of control unit 11 include an actual torque obtaining section 11a, a target torque obtaining section 11b, a clutch actuator control section 11c and a shift actuator control section 11d.

Actual torque obtaining section 11a obtains actual transmission torque Tac in a predetermined sampling cycle (for example, several milliseconds) during engaging operation of clutch 40 in which drive-side member 41 and driven-side member 42 approach each other. This processing is executed as follows, for example. In the description herein, actual transmission torque Tac is referred to as torque transmitted from drive-side member 41 to driven-side member 42.

Actual torque obtaining section 11a calculates actual transmission torque Tac based on the torque outputted from engine 30 (hereinafter referred to as EG torque TEac) and based on the inertia torque (hereinafter referred to as EG-side inertia torque TIac) produced on a mechanism upstream of the drive-side member 41 in the torque transmission path, such as crankshaft 34, piston 32 and primary speed reducing mechanism 36 (hereinafter referred to as engine-side mechanism). EG-side inertia torque TIac is obtained by multiplying the inertia moment I on the engine-side mechanism by the variation in engine speed Ωe per unit time, dΩe/dt. Inertia moment I is calculated in advance, for example, in the manufacture of engine 30.

An example of the processing for obtaining EG torque Teac is first described. Actual torque obtaining section 11a obtains EG torque TEac based on accelerator displacement Aop, detected by accelerator operation detector 17, and based on engine speed Ωe detected by engine speed detector 18. For example, storage unit 12 stores in advance a table (hereinafter referred to as EG torque table) that establishes the correspondence between EG torque TEac, and engine speed Ωe and accelerator displacement Aop. Then, actual torque obtaining section 11a detects accelerator displacement Aop based on the request torque signal inputted from accelerator operation detector 17, while detecting engine speed Ωe based on the signal inputted from engine speed detector 18. Then, actual torque obtaining section 11a refers to the EG torque table to obtain the EG torque TEac that corresponds to the detected accelerator displacement Aop and engine speed Ωe. Storage unit 12 may store in advance an expression (hereinafter referred to as EG torque relational expression) that represents the relationship between engine speed Ωe, accelerator displacement Aop and EG torque TEac. In this case, actual torque obtaining section 11a substitutes the detected engine speed Ωe and accelerator displacement Aop into the EG torque relational expression in order to calculate EG torque TEac.

An example of the processing for obtaining EG-side inertia torque TIac is now described. Actual torque obtaining section 11a obtains EG-side inertia torque TIac based on engine speed Ωe. Specifically, actual torque obtaining section 11a calculates a variation in engine speed Ωe per unit time (hereinafter referred to as EG speed variation dΩe/dt) based on the signal inputted from engine speed detector 18. Then, a value, which is obtained by multiplying the EG speed variation dΩe/dt by the inertia moment on the engine-side mechanism (hereinafter referred to as engine-side inertia moment I), is defined as EG-side inertia torque TIac (TIac=I×dΩe/dt). Alternatively, storage unit 12 may store in advance a table that establishes the correspondence between EG speed variation dΩe/dt and EG-side inertia torque TIac. In this case, actual torque obtaining section 11a refers to the table to obtain EG-side inertia torque TIac that corresponds to EG speed variation dΩe/dt.

Then, actual torque obtaining section 11a subtracts EG-side inertia torque TIac, produced due to changes in engine speed Ωe, from EG torque TEac, obtained from the aforementioned processing, in order to calculate actual transmission torque Tac. For example, actual torque obtaining section 11a substitutes EG torque TEac and EG-side inertia torque TIac into the following expression (1) stored in advance in storage unit 12 in order to calculate actual transmission torque Tac.

$$Tac = (TEac - TIac) \times Pratio \tag{1}$$

Where Pratio is the speed reduction ratio of primary speed reducing mechanism 36 (Pratio=the number of teeth of driven-side primary reduction gear 36b/the number of teeth of drive-side primary reduction gear 36a).

The processing executed by actual torque obtaining section 11a is not limited to this. For example, in the above description, actual torque obtaining section 11a calculates actual transmission torque Tac. More specifically, after obtaining EG torque TEac and EG-side inertia torque TIac, actual torque obtaining section 11a subtracts the obtained EG-side inertia torque TIac from the obtained EG torque TEac, and multiplies the subtraction result by the speed reduction ratio Pratio of primary speed reducing mechanism 36. However, for example, storage unit 12 may store in advance a table or an expression that establishes the correspondence between actual transmission torque Tac, and engine speed Ωe, accelerator displacement Aop and EG speed variation dΩe/dt. In this case, actual torque obtaining section 11a uses the table or the expression to directly obtain actual transmission torque Tac that corresponds to engine speed Ωe, EG speed variation dΩe/dt and accelerator displacement Aop.

Alternatively, actual torque obtaining section 11a may obtain EG torque TEac based on the pressure of air (hereinafter referred to as intake pressure) flowing through the interior of intake pipe 35. For example, storage unit 12 stores a table that establishes the correspondence between EG torque TEac, and the intake pressure and engine speed Ωe. In addition, a pressure sensor for outputting a signal according to the intake pressure is disposed in intake pipe 35. In this case, actual torque obtaining section 11a detects the intake pressure based on the signal inputted from the pressure sensor when the crank angle is a predetermined value (for example, at the end of intake stroke), while detecting engine speed Ωe based on the signal inputted from engine speed detector 18. Then, actual torque obtaining section 11a refers to the table stored in storage unit 12 to obtain EG torque TEac that corresponds to the detected intake pressure and engine speed Ωe.

A torque detector may be provided for outputting an electric signal according to the torque transmitted to driven-side member 42. Then, actual torque obtaining section 11a obtains actual transmission torque Tac transmitted to driven-side member 42 based on the signal inputted from the torque detector. An example of the torque detector is a sensor for outputting an electric signal according to the strain stress on main shaft 52 to which torque is transmitted.

The processing executed by target torque obtaining section 11b is now described. Target torque obtaining section 11b obtains torque, which is supposed to be transmitted from drive-side member 41 to driven-side member 42 of clutch 40, as target transmission torque Ttg. As described above, target torque obtaining section 11b estimates torque to be transmitted from drive-side member 41 to driven-side member 42 after drive-side member 41 and driven-side member 42 are completely engaged, and defines the estimated torque as target transmission torque Ttg. The wording, "when drive-side member 41 and driven-side member 42 are completely engaged", means the point in time when there is no difference in rotational speed between drive-side member 41 and driven-side member 42 (hereinafter referred to as clutch rotational speed difference Ωdiff) or the point in time when clutch rotational speed difference Ωdiff is equal to or below a predetermined value. Target torque obtaining section 11b executes the following processing, for example.

Target torque obtaining section 11b estimates torque (hereinafter referred to as post-completion EG torque TEfin) to be outputted from engine 30 after completion of the clutch engagement. In addition, target torque obtaining section 11b estimates inertia torque (hereinafter referred to as post-completion EG-side inertia torque TIfin) to be produced on the engine-side mechanism after completion of the clutch engagement. Target torque obtaining section 11b then obtains target transmission torque Ttg based on the estimated post-completion EG-side inertia torque TIfin and post-completion EG torque TEfin.

The processing for estimating post-completion EG torque TEfin is now described. Target torque obtaining section 11b estimates engine speed Ωefin after completion of the clutch engagement based on the rotational speed of the downstream transmission mechanism, which is obtained before the start of or during the engaging operation of clutch 40. Target torque obtaining section 11b then estimates post-completion EG torque TEfin based on estimated engine speed Ωefin and accelerator displacement Aop obtained before the start of or during the engaging operation of the clutch.

For example, target torque obtaining section 11b obtains the rotational speed of driven-side member 42 that forms the downstream transmission mechanism, while obtaining the rotational speed of drive-side member 41, in order to calculate the difference in rotational speed between these members or clutch rotational speed difference Ωdiff. In addition, target torque obtaining section 11b obtains engine speed Ωe based on the signal inputted from engine speed detector 18. Target torque obtaining section 11b then estimates engine speed Ωefin after completion of the clutch engagement based on clutch rotational speed difference Ωdiff and engine speed Ωe. In other words, engine speed Ωefin after completion of the clutch engagement depends on engine speed Ωe and the rotational speed of the downstream transmission mechanism, which are obtained before the start of or during the engaging operation of clutch 40. More specifically, a value of engine speed Ωefin after completion of the clutch engagement is estimated to change from engine speed Ωe during engaging operation of the clutch by an amount depending on clutch rotational speed difference Ωdiff. Thus, target torque obtaining section 11b substitutes clutch rotational speed difference Ωdiff and engine speed Ωe, which are obtained during engaging operation of clutch 40, into the following expression (2) in order to calculate engine speed Ωefin.

$$\Omega efin = \Omega e - \Omega diff \times Pratio \tag{2}$$

Then, target torque obtaining section 11b detects accelerator displacement Aop by the rider based on the request torque signal inputted from accelerator operation detector 17 during engaging operation of clutch 40, and refers to the aforementioned EG torque table to define the torque that corresponds to the detected accelerator displacement Aop and the calculated engine speed Ωefin as post-completion EG torque TEfin.

The processing for estimating post-completion EG-side inertia torque TIfin is now described. A variation in engine speed Ωefin per unit time, dΩefin/dt, after completion of the clutch engagement depends on the variation in rotational speed of the downstream transmission mechanism per unit time obtained before the start of or during the engaging operation of clutch 40. For example, as the variation in rotational speed of the downstream transmission mechanism during engaging operation of clutch 40 is larger, the variation dΩefin/dt in engine speed Ωefin after completion of the clutch engagement is larger, accordingly. Consequently, post-completion EG-side inertia torque TIfin is estimated to be larger. Thus, target torque obtaining section 11b estimates post-completion EG-side inertia torque TIfin based on the variation in rotational speed of the downstream transmission mechanism obtained before the start of or during the engaging operation of clutch 40.

For example, target torque obtaining section 11b calculates a variation in rotational speed Ωcl of the downstream transmission mechanism or driven-side member 42 per unit time (hereinafter the variation is referred to as driven-side rotational speed variation dΩcl/dt) based on the signal inputted from clutch rotational speed detector 23b. Then, target torque obtaining section 11b substitutes the driven-side rotational speed variation dΩcl/dt into the following expression (3), for example, in order to calculate post-completion EG-side inertia torque TIfin.

$$TIfin = d\Omega cl/dt \times Pratio \times I \quad (3)$$

Where I is the EG-side inertia moment and Pratio is the speed reduction ratio of primary speed reducing mechanism 36, as described above.

Alternatively, target torque obtaining section 11b may execute this processing for calculating post-completion EG-side inertia torque TIfin only before engaging operation of clutch 40 starts or in a predetermined cycle during the engaging operation. More specifically, target torque obtaining section 11b calculates the driven-side rotational speed variation dΩcl/dt in a predetermined sampling cycle, for example, during engaging operation of clutch 40, and obtains post-completion EG-side inertia torque TIfin based on the calculated driven-side rotational speed variation dΩcl/dt. Then, target torque obtaining section 11b uses the sequentially-calculated post-completion EG-side inertia torque TIfin to calculate target transmission torque Ttg. The calculation in such a manner allows a deviation between target transmission torque Ttg and actual transmission torque Tac to be reduced at the time of completely engaging clutch 40.

In addition, target torque obtaining section 11b may calculate the driven-side rotational speed variation dΩcl/dt based on the signal inputted from clutch rotational speed detector 23b immediately before clutch 40 is disengaged (for example, several hundred milliseconds before clutch 40 starts being disengaged) in the processing executed by clutch actuator control section 11c. Then, target torque obtaining section 11b may calculate post-completion EG-side inertia torque TIfin based on the calculated driven-side rotational speed variation dΩcl/dt, and in the process of the engaging operation of clutch 40, may use the calculated post-completion EG-side inertia torque TIfin to calculate target transmission torque Ttg. Thereby, the processing load is reduced in the process of the engaging operation of clutch 40.

The processing for obtaining post-completion EG-side inertia torque TIfin is not limited to the aforementioned processing based on the rotational speed Ωcl of driven-side member 42. For example, motorcycle 1 may be provided with a detector for detecting the rotational speed of countershaft 55. In this case, target torque obtaining section 11b calculates a variation in rotational speed Ωcout of countershaft 55 per unit time, dΩcout/dt. Then, target torque obtaining section 11b substitutes the variation dΩcout/dt in rotational speed of countershaft 55 into the following expression (4), for example, in order to calculate post-completion EG-side inertia torque TIfin.

$$TIfin = d\Omega cout/dt \times Pratio \times Mratio \times I \quad (4)$$

Where Mratio is the speed reduction ratio of gearbox 51 (the number of teeth of shift gears 54a, 54b/the number of teeth of shift gears 53a, 53b) after completion of the clutch engagement.

Alternatively, target torque obtaining section 11b may obtain post-completion EG-side inertial torque TIfin based on the vehicle speed signal inputted from vehicle speed detector 19. Specifically, target torque obtaining section 11b calculates a variation in rotational speed Ωfinal of axle 3a per unit time, dΩfinal/dt, based on the vehicle speed signal. Then, target torque obtaining section 11b may substitute the variation dΩfinal/dt in rotational speed of axle 3a into the following expression (5), for example, in order to calculate post-completion EG-side inertia torque TIfin.

$$TIfin = d\Omega final/dt \times Pratio \times Mratio \times Tratio \times I \quad (5)$$

Where Tratio is the speed reduction ratio of transmission mechanism 57.

The processing for obtaining target transmission torque Ttg based on post-completion EG torque TEfin and post-completion EG-side inertia torque TIfin is now described. Target torque obtaining section 11b subtracts post-completion EG-side inertia torque TIfin from post-completion EG torque TEfin, which are both obtained from the aforementioned processing, in order to calculate target transmission torque Ttg. For example, target torque obtaining section 11b substitutes post-completion EG torque TEfin and post-completion EG-side inertia torque TIfin into the following expression (6) in order to calculate target transmission torque Ttg.

$$Ttg = (TEfin - TIfin) \times Pratio \quad (6)$$

Alternatively, target torque obtaining section 11b may correct the subtraction result, obtained by subtracting post-completion EG-side inertia torque TIfin from post-completion EG torque TEfin, and provide the corrected result for the processing for calculating target transmission torque Ttg. For example, target torque obtaining section 11b substitutes post-completion EG torque TEfin and post-completion EG-side inertia torque TIfin into the following expression (7) in order to calculate target transmission torque Ttg.

$$Ttg = (TEfin - TIfin) \times Ka \times Pratio \quad (7)$$

Where Ka is a correction value. For example, correction value Ka is determined according to accelerator displacement Aop, which is detected based on the signal inputted from accelerator operation detector 17, and is preset such that correction value Ka increases in proportion to accelerator displacement Aop. Therefore, as accelerator displacement Aop increases, target transmission torque Ttg, which is supposed to be transmitted from drive-side member 41 to the downstream transmission mechanism, is preset higher, so that the rider obtains an acceleration feeling according to the rider's accelerator operation.

In the process of the engaging operation of clutch 40, target torque obtaining section 11b executes the aforementioned processing for estimating post-completion EG torque TEfin and the aforementioned processing for estimating post-completion EG-side inertia torque TIfin in a predetermined sampling cycle, in order to obtain target transmission torque Ttg based on the estimated post-completion EG torque TEfin and post-completion EG-side inertia torque TIfin. Thereby, in the process of the engaging operation of clutch 40, target transmission torque Ttg changes gradually depending on the rider's accelerator operation or running conditions of the vehicle, so that operability of the vehicle improves.

The processing executed by target torque obtaining section 11b is not limited to the aforementioned processing. For example, in the above description, after calculating post-completion EG torque TEfin and post-completion EG-side inertia torque TIfin, target torque obtaining section 11b subtracts post-completion EG-side inertial torque TIfin from post-completion EG torque TEfin to obtain target transmission torque Ttg. However, target torque obtaining section 11b may obtain target transmission torque Ttg directly from a value detected by the respective detectors. More specifically, storage unit 12 stores in advance an expression that associates accelerator displacement Aop, clutch rotational speed difference Ωdiff, driven-side rotational speed variation dΩcl/dt, and engine speed Ωe with target transmission torque Ttg. Target torque obtaining section 11b then may substitute the detected accelerator displacement Aop, clutch rotational speed difference Ωdiff, driven-side rotational speed variation dΩcl/dt and engine speed Ωe into the expression to calculate target transmission torque Ttg.

Alternatively, target torque obtaining section 11b may obtain target transmission torque Ttg based on accelerator displacement Aop in the process of the engaging operation of clutch 40 and based on actual transmission torque Tac before clutch actuator control section 11c starts disengaging clutch 40. This processing is executed as follows, for example.

Storage unit 12 stores in advance a table that establishes the correspondence between target transmission torque Ttg, and accelerator displacement Aop and actual transmission torque Tac or an expression that represents the relationship between accelerator displacement Aop, actual transmission torque Tac and target transmission torque Ttg. For example, in the table and expression, as accelerator displacement Aop and actual transmission torque Tac increase, target transmission torque Ttg increases. When a gear shifting command signal is inputted from shift-up switch 9a or shift-down switch 9b, target torque obtaining section 11b obtains actual transmission torque Tac before clutch 40 is disengaged in the processing executed by clutch actuator control section 11c. The processing for obtaining actual transmission torque Tac is performed in the same manner as the aforementioned processing by actual torque obtaining section 11a, for example. In the process of the engaging operation of clutch 40, target torque obtaining section 11b detects accelerator displacement Aop by the rider in a predetermined sampling cycle. Target torque obtaining section 11b then uses the table or expression stored in storage unit 12 to obtain target transmission torque Ttg that corresponds to the detected accelerator displacement Aop and actual transmission torque Tac obtained before clutch 40 is disengaged.

Alternatively, target torque obtaining section 11b may obtain target transmission torque Ttg based on the intake pressure. This processing is executed as follows, for example. Storage unit 12 stores in advance a table that establishes the correspondence between the torque of engine 30, and the intake pressure and engine speed Ωe. In the processing for calculating post-completion EG torque TEfin, target torque obtaining section 11b estimates engine speed Ωefin after completion of the clutch engagement in the same manner as the aforementioned processing. In addition, target torque obtaining section 11b detects the intake pressure at the time when the crank angle is a predetermined value (for example, at the end of intake stroke). Then, target torque obtaining section 11b may refer to the table stored in storage unit 12 to obtain torque that corresponds to the detected intake pressure and the estimated engine speed Ωefin in order to define the obtained torque as post-completion EG torque TEfin.

Clutch actuator control section 11c actuates clutch actuator 14 to control the engagement state of clutch 40 based on actual transmission torque Tac obtained by actual torque obtaining section 11a. Specifically, clutch actuator control section 11c actuates clutch actuator 14 in a predetermined cycle (for example, a cycle for calculating actual transmission torque Tac and target transmission torque Ttg) by an actuation amount according to the difference between actual transmission torque Tac and target transmission torque Ttg (hereinafter referred to as torque deviation ΔT (ΔT=Ttg−Tac)). Clutch actuator control section 11c executes the following processing, for example.

Storage unit 12 stores in advance an expression (hereinafter referred to as actuation amount relational expression) that represents the relationship between torque deviation ΔT and the actuation amount of clutch actuator 14. Clutch actuator control section 11c calculates torque deviation ΔT every time actual torque obtaining section 11a obtains actual transmission torque Tac. Then, clutch actuator control section 11c substitutes the calculated torque deviation ΔT into the actuation amount relational expression in order to obtain the amount by which clutch actuator 14 is to be actuated (hereinafter referred to as command actuation amount), and outputs a signal to clutch actuator drive circuit 13 according to the command actuation amount. Clutch actuator drive circuit 13 supplies electric power to clutch actuator 14 according to the input signal. Clutch actuator 14 is actuated by the command actuation amount during the aforementioned cycle. Then, the pressing force between drive-side member 41 and driven-side member 42 is varied by an amount according to the actuation amount of clutch actuator 14, so that the engagement state of clutch 40 changes.

Figure 6:
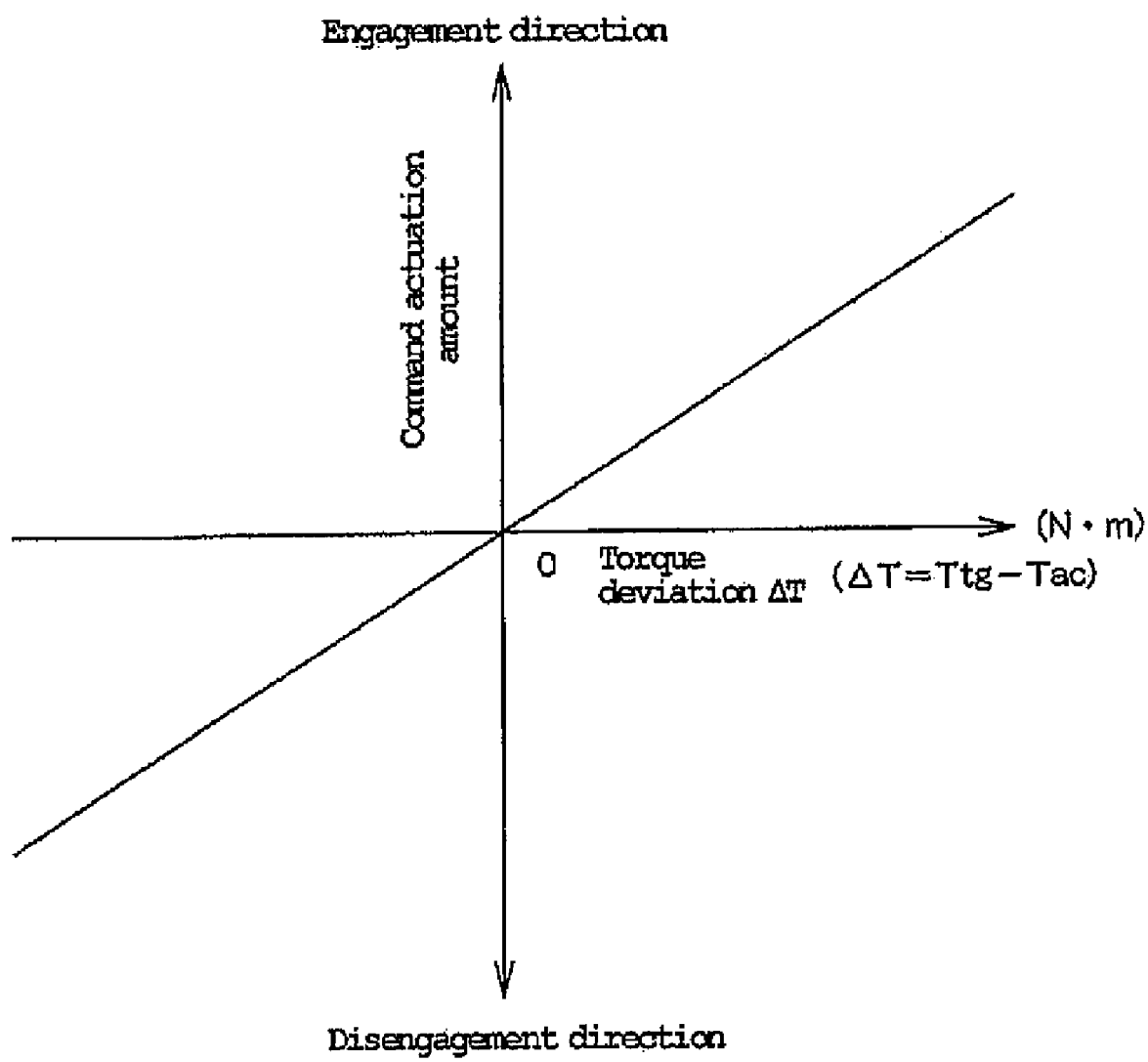
FIG. 6 is a graph illustrating the relationship between a difference between target transmission torque and actual transmission torque, and a command actuation amount obtained from an actuation amount relational expression.

For example, the command actuation amount is preset larger as torque deviation ΔT increases. FIG. 6 is a graph showing the relationship between torque deviation ΔT (ΔT=Ttg−Tac) and the command actuation amount obtained from the actuation amount relational expression. In FIG. 6, the actuation amount relational expression is established such that if torque deviation ΔT is positive, clutch actuator 14 is actuated in the direction to engage clutch 40. In turn, the actuation amount relational expression is established such that if torque deviation ΔT is negative, clutch actuator 14 is actuated in the direction to disengage clutch 40. In addition, the actuation amount relational expression is established such that the command actuation amount increases in proportion to torque deviation ΔT. As described above, the command actuation amount is an amount by which clutch actuator 14 is actuated during one cycle, and the command actuation amount is preset in such a manner that it increases in proportion to torque deviation ΔT. This makes it possible to increase the speed at which clutch actuator 14 operates, if torque deviation ΔT is large.

The relationship between torque deviation ΔT and the command actuation amount is not limited to the relationship shown in FIG. 6. For example, the actuation amount relational expression may be established such that the command actuation amount is proportional to the square of torque deviation ΔT.

Further, in place of the actuation amount relational expression, storage unit 12 may store a table (hereinafter referred to as actuation amount table) that establishes the correspondence between the command actuation amount and torque deviation ΔT. In this case, clutch actuator control section 11c refers to the actuation amount table to obtain the command actuation amount that corresponds to torque deviation ΔT. Alternatively, the actuation amount table may establish the correspondence between the command actuation amount, and target transmission torque Ttg and actual transmission torque Tac. In this case, clutch actuator control section 11c refers to the actuation amount table, without calculating torque deviation ΔT, to directly obtain the command actuation amount that corresponds to target transmission torque Ttg and actual transmission torque Tac.

Figure 7:
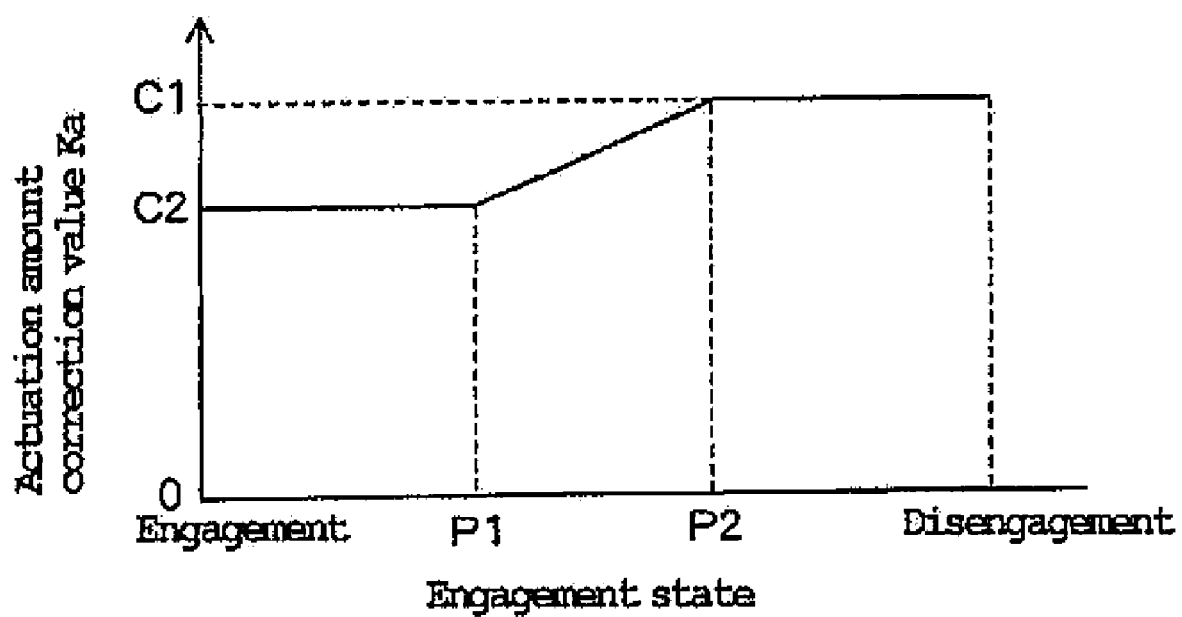
FIG. 7 is a graph showing the relationship between an actuation amount correction value and an engagement state of the clutch.

Alternatively, clutch actuator control section 11c may correct the command actuation amount based on a predetermined correction value (hereinafter referred to as actuation amount correction value Km) depending on the engagement state of clutch 40. FIG. 7 is a graph showing an example of the relationship between actuation amount correction value Km and the engagement state of clutch 40, in which the horizontal axis represents the engagement state of clutch 40 and the vertical axis represents actuation amount correction value Km. In the graph, an actuation amount correction value C1 when clutch 40 is disengaged is preset larger than an actuation amount correction value C2 when clutch 40 is engaged. In addition, when the position of clutch 40 (the positional relationship between drive-side member 41 and driven-side member 42) is between P1 and P2, actuation amount correction value Km is preset larger as clutch actuator 14 is actuated in the direction to disengage clutch 40. In the case where actuation amount correction value Km is preset in this manner, clutch actuator control section 11c multiplies the difference between target transmission torque Ttg and actual transmission torque Tac by actuation amount correction value Km, for example, and refers to the actuation amount table and actuation amount relational expression to obtain the command actuation amount that corresponds to the multiplication result ((Ttg−Tac)×Km).

When the rider provides gear shifting instructions, clutch actuator control section 11c actuates clutch actuator 14 to disengage clutch 40 in order to temporarily interrupt torque transmission from drive-side member 41 to driven-side member 42. After that, clutch actuator control section 11c detects that some of the shift gears 53a, 53b, 54a, 54b, which are associated with the gear shifting instructions, have been moved already based on the signal inputted from gear position detector 21, and then executes the aforementioned processing. More specifically, according to the obtained command actuation amount, clutch actuator control section 11c actuates clutch actuator 14 in the direction to engage clutch 40.

When the rider operates shift-up switch 9a or shift-down switch 9b to provide gear shifting instructions, shift actuator control section 11d actuates shift actuator 16 to change the pairs of shift gears to transmit torque. Specifically, after detecting that clutch 40 is disengaged based on the signal inputted from clutch position detector 22, shift actuator control section 11d outputs a signal to shift actuator drive circuit 15 according to the rider's gear shifting instructions. Thereby, shift actuator drive circuit 15 supplies electric power to actuate shift actuator 16, in order to move some of the shift gears 53a, 53b, 54a, 54b according to the gear shifting instructions.

Figure 8:
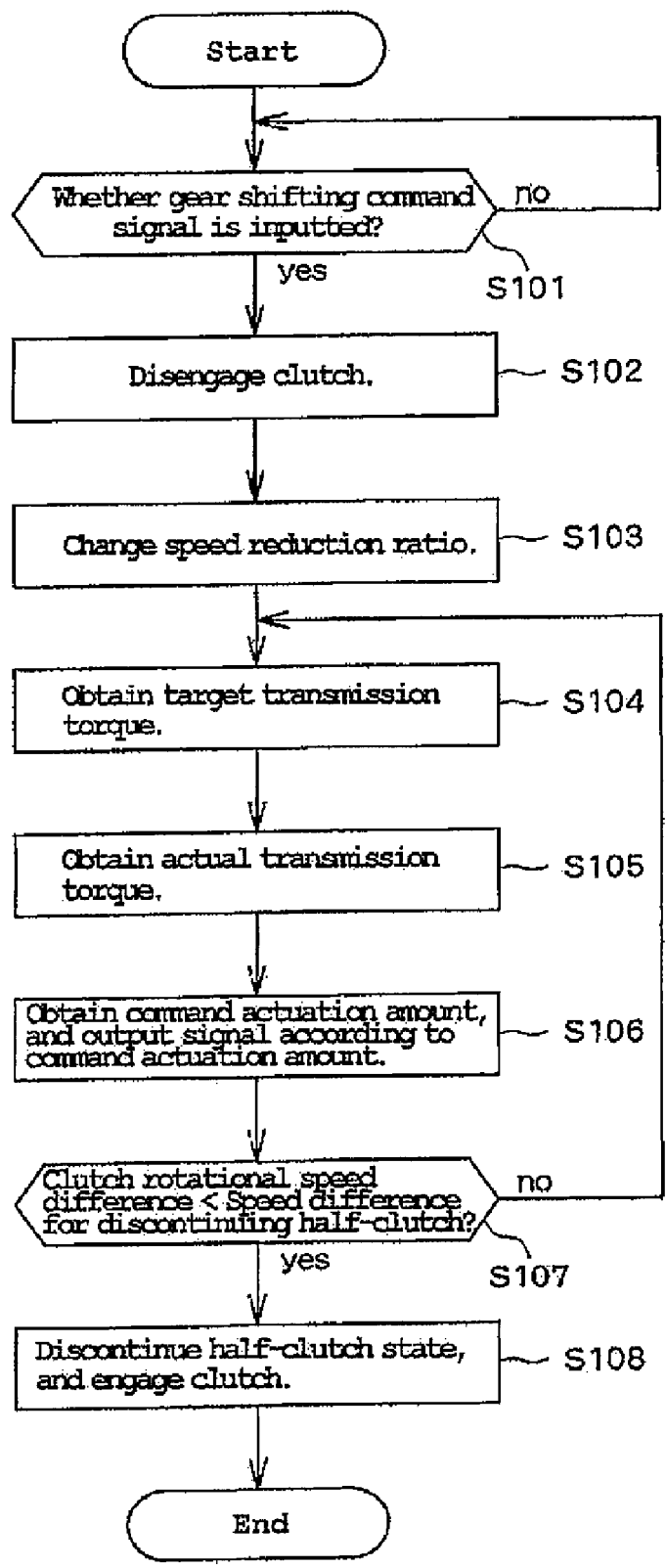
FIG. 8 is a flowchart showing an example of processing steps executed by the control unit.

The flow of processing executed by the control unit 11 is now described. FIG. 8 is a flowchart showing an example of the processing executed by control unit 11. Here, the processing executed by control unit 11 at gear shifting is described as an example.

Clutch actuator control section 11c determines whether or not a gear shifting command signal is inputted from shift-up switch 9a or shift-down switch 9b (S101). If no gear shifting command signal is inputted, clutch actuator control section 11c waits until the gear shifting command signal is inputted. When the gear shifting command signal is inputted, clutch actuator control section 11c actuates clutch actuator 14 to disengage clutch 40 (S102). After detecting that clutch 40 is disengaged based on the signal inputted from clutch position detector 22, shift actuator control section 11d actuates shift actuator 16 to move some of the shift gears 53a, 53b, 54a, 54b, which are associated with the gear shifting command, in order to change the speed reduction ratios of gearbox 51 (S103). After detecting that some of the shift gears 53a, 53b, 54a, 54b have been moved already based on the signal inputted from gear position detector 21, clutch actuator control section 11c executes the processing for engaging clutch 40 that has been disengaged.

Specifically, target torque obtaining section 11b obtains target transmission torque Ttg (S104). For example, target torque obtaining section 11b detects accelerator displacement Aop based on the request torque signal inputted from accelerator operation detector 17, while detecting the rotational speed Ωcl of driven-side member 42 based on the signal inputted from clutch rotational speed detector 23b. Then, based on the detected rotational speed Ωcl, the variation dΩcl/dt in rotational speed Ωcl per unit time, and the detected accelerator displacement Aop, target torque obtaining section 11b estimates torque, which is supposed to be transmitted to driven-side member 42 after completion of the clutch engagement, and defines the estimated torque as target transmission torque Ttg.

In turn, actual torque obtaining section 11a obtains actual transmission torque Tac currently transmitted from drive-side member 41 to driven-side member 42 (step S105). For example, actual torque obtaining section 11a detects engine speed Ωe, while calculating the variation in engine speed Ωe per unit time or EG speed variation dΩe/dt. Actual torque obtaining section 11a then obtains actual transmission torque Tac based on engine speed Ωe and EG speed variation dΩe/dt.

Next, clutch actuator control section 11c obtains the amount by which clutch actuator 14 is to be actuated, that is, the command actuation amount based on target transmission torque Ttg obtained in step S104 and actual transmission torque Tac obtained in step S105, and outputs a signal to clutch actuator drive circuit 15 according to the obtained command actuation amount (S106). Consequently, drive-side member 41 and driven-side member 42 approach each other, so that clutch 40 is in a half-clutch state.

Clutch actuator control section 11c then calculates the difference (clutch rotational speed difference Ωdiff) in rotational speed between drive-side member 41 and driven-side member 42 based on the signals inputted from clutch rotational speed detectors 23a, 23b, and determines whether or not the calculated clutch rotational speed difference Ωdiff is smaller than a predetermined value (hereinafter referred to as speed difference for discontinuing half-clutch) (S107). Alternatively, clutch actuator control section 11c may determine whether or not clutch rotational speed difference Ωdiff continues to be smaller than the speed difference for discontinuing half-clutch for a given time period. In step S107, if clutch rotational speed difference Ωdiff is equal to or greater than the speed difference for discontinuing half-clutch, control unit 11 returns to step S104 to reexecute the subsequent processing steps. When clutch 40 is in a half-clutch state, control unit 11 repeats steps S104-S106 in a predetermined cycle. This allows actual transmission torque Tac to follow target transmission torque Ttg. In contrast, in step S107, if clutch rotational speed difference Ωdiff is smaller than the speed difference for discontinuing half-clutch, clutch actuator control section 11c actuates clutch actuator 14 to discontinue the half-clutch state of clutch 40 and engage clutch 40 completely (S108). The aforementioned processing is an example of the processing executed by control unit 11 at gear shifting.

Figure 9:
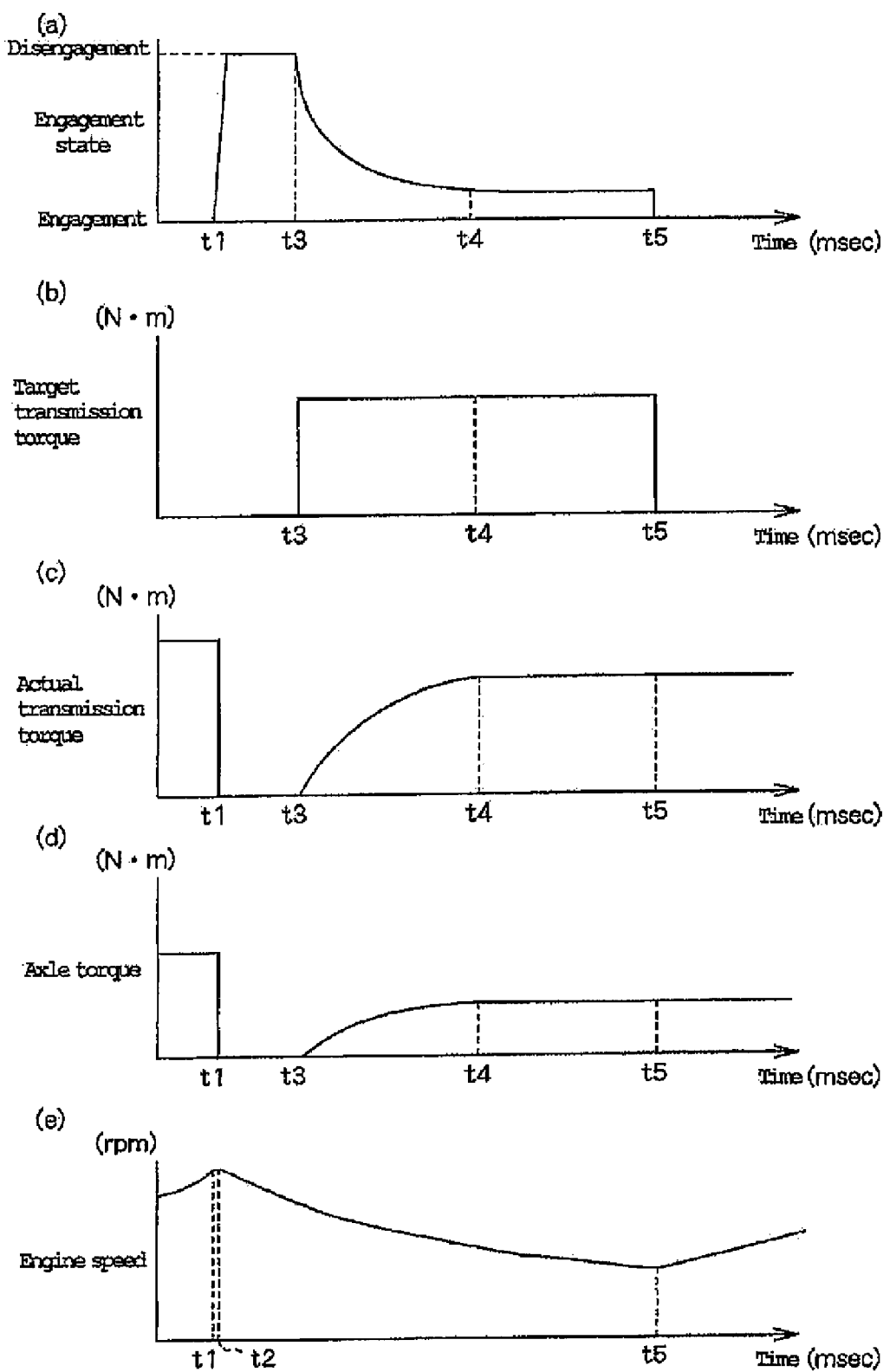
FIGS. 9(a)-9(e) are time charts showing examples of results from processing executed at gear shifting.

The results of the processing executed by control unit 11 are now described. FIGS. 9(a)-9(e) are time charts to illustrate the results of the processing executed at gear changes, wherein FIG. 9(a) shows changes in engagement state of clutch 40 with respect to time; FIG. 9(b) shows changes in target transmission torque Ttg with respect to time; FIG. 9(c) shows changes in actual transmission torque Tac with respect to time; FIG. 9(d) shows changes in torque transmitted to axle 3a with respect to time; and FIG. 9(e) shows changes in engine speed Ωe with respect to time. The description herein is an example in which gearbox 51 is shifted-up, and the torque, transmitted to axle 3a of rear wheel 3 after the gear shifting, decreases compared to before the gear shifting.

When shift-up switch 9a inputs a gear shifting command signal at time t1, clutch actuator control section 11c executes processing to actuate clutch actuator 14, so that clutch 40 is disengaged as shown in FIG. 9(a). At this time, as shown in FIGS. 9(c) and 9(d), actual transmission torque Tac transmitted from drive-side member 41 to driven-side member 42 of clutch 40 and the torque transmitted to the axle 3a are zero. In turn, as shown in FIG. 9(e), engine speed increases slightly because the load on engine 30 is eliminated (see time t2). After that, at time t3, when some of the shift gears 53a, 53b, 54a, 54b have been moved already in the processing executed by shift actuator control section 11d, the torque estimated to be transmitted to driven-side member 42 after completion of the clutch engagement is preset as target transmission torque Ttg, as shown in FIG. 9(c). In addition, clutch actuator 14 starts being actuated by the command actuation amount according to torque deviation ΔT. Consequently, as shown in FIG. 9(a), clutch 40 is in half-clutch state in which drive-side member 41 and driven-side member 42 contact each other. As shown in FIGS. 9(c) and 9(d), actual transmission torque Tac transmitted to driven-side member 42 and the torque transmitted to axle 3a start increasing. Then, at time t4, target transmission torque Ttg and actual transmission torque Tac are equal to each other. As shown in FIG. 9(d), the torque, estimated to be transmitted at the time when drive-side member 41 and driven-side member 42 are completely engaged (at time t5 in FIGS. 9(a)-9(e)), is transmitted to axle 3a and driven-side member 42 at time t4. From time t3 to time t4, as torque deviation ΔT is gradually smaller, displacement of clutch 40 per unit time is gradually smaller, accordingly, as shown in FIG. 9(a). In addition, as shown in FIG. 9(e), because the rotational speed of driven-side member 42 is normally lower than the rotational speed of drive-side member 41 at the time of shift-up operation, engine speed Ωe decreases moderately.

After that, actual transmission torque Tac and target transmission torque Ttg continue to be equal to each other, and therefore, the engagement state of clutch 40 is maintained. After that, at time t5, when clutch rotational speed difference Ωdiff is smaller than the aforementioned speed difference for discontinuing half-clutch, clutch actuator control section 11c actuates clutch actuator 14 to completely engage driven-side member 42 with drive-side member 41 and discontinue the half-clutch state. At this time, as shown in FIGS. 9(c) and 9(d), the torque transmitted to driven-side member 42 and axle 3a remains unchanged and is maintained at the level at time t4. In FIGS. 9(a) to 9(e), when clutch 40 is in a half-clutch state, target transmission torque Ttg is constant. However, in case the rider increases accelerator displacement Aop when clutch 40 is in a half-clutch state, target transmission torque Ttg, obtained by target torque obtaining section 11b, changes, accordingly. In this case, clutch actuator control section 11c controls the engagement state of clutch 40 such that actual transmission torque Tac follows target transmission torque Ttg.

The above-mentioned clutch controller 10 is provided with: target torque obtaining section 11b for obtaining torque that is supposed to be transmitted from drive-side member 41 to the downstream transmission mechanism including driven-side member 42 as target transmission torque Ttg; and clutch actuator control section 11c for actuating clutch actuator 14 based on target transmission torque Ttg. Thus, target torque obtaining section 11b estimates the torque to be transmitted from drive-side member 41 to the downstream transmission mechanism after drive-side member 41 and driven-side member 42 are completely engaged, and defines the estimated torque as target transmission torque Ttg.

This minimizes changes in torque transmitted via clutch 40 at the time of completely engaging clutch 40, and thus improves riding comfort when engaging operation of clutch 40 is required, such as at gear shifting or vehicle start-up. In addition, changes in torque are minimized at the time of completely engaging clutch 40, thereby allowing the rider to perceive less time spent for engaging clutch 40.

Further, in the above-mentioned clutch controller 10, target torque obtaining section 11b estimates post-completion EG torque TEfin, to be outputted from engine 30 after drive-side member 41 and driven-side member 42 are completely engaged, and post-completion EG-side inertia torque TIfin, to be produced on the mechanism upstream of drive-side member 41 (the engine-side mechanism) in the torque transmission path after drive-side member 41 and driven-side member 42 are completely engaged. Then, based on estimated post-completion EG torque TEfin and post-completion EG-side inertia torque TIfin, target torque obtaining section 11b estimates the torque to be transmitted to the downstream mechanism after drive-side member 41 and driven-side member 42 are completely engaged. Thus, by simple processing, target transmission torque Ttg is set at the torque estimated to be transmitted from drive-side member 41 to the downstream transmission mechanism after drive-side member 41 and driven-side member 42 are completely engaged.

Clutch controller 10 is further provided with actual torque obtaining section 11a for obtaining torque transmitted from drive-side member 41 to driven-side member 42 as actual transmission torque Tac. Clutch actuator control section 11c actuates the actuator based on the difference between actual transmission torque Tac and target transmission torque Ttg. This allows for control of actual transmission torque Tac to approximate target transmission torque Ttg, which minimizes the changes in actual transmission torque Tac at the time of completely engaging clutch 40, and thus improves riding comfort when engaging operation of clutch 40 is required, such as at gear shifting or vehicle start-up.

In clutch controller 10, actual torque obtaining section 11a obtains actual transmission torque Tac based on EG torque TEac outputted from engine 30 and based on EG-side inertia torque TIac produced on the mechanism upstream of drive-side member 41 (the engine-side mechanism) in the torque transmission path. Actual transmission torque Tac is thus obtained without providing any specific sensor for outputting a signal according to actual transmission torque Tac.

Still further, the above-mentioned clutch controller 10 reduces the impacts of aging (for example, wear-out) or thermal expansion of clutch 40. A conventional clutch controller controls the clutch based on the difference in rotational speed between the drive-side and driven-side members of the clutch. Therefore, for example, when a conventional clutch controller continues to control the clutch in the same manner as above even after the drive-side and driven-side members have worn out and thus the friction coefficient thereof has changed from the original friction coefficient, sufficient torque transmission is not provided from the drive-side member to the driven-side member. Consequently, the vehicle can decelerate excessively during engaging operation of the clutch. Also, when the drive-side and driven-side members are subjected to thermal expansion, the drive-side and driven-side members are engaged in a time period shorter than the original time period. This causes shocks to be generated when these members are completely engaged. In contrast, the above-mentioned clutch controller 10 controls the engagement state of clutch 40 based on actual transmission torque Tac actually transmitted to driven-side member 42, thus reducing deterioration of riding comfort due to aging or thermal expansion of the clutch.

The present invention is not limited to the above-mentioned clutch controller 10, and can have various alternatives.

For example, in the above description, clutch actuator control section 11c actuates clutch actuator 14 based on the difference between target transmission torque Ttg and actual transmission torque Tac or torque deviation ΔT. However, for example, storage unit 12 may store a table that establishes correspondence between target transmission torque Ttg and the clutch position (for example, the rotation angle of the output shaft of clutch actuator 14) detected by clutch position detector 21. Then, referring to the table, clutch actuator control section 11c may actuate clutch actuator 14 such that the clutch position or rotation angle of the output shaft of clutch actuator 14 corresponds to target transmission torque Ttg calculated by the aforementioned processing.

In the above description, actual transmission torque Tac is defined as torque transmitted from drive-side member 41 to driven-side member 42. However, actual transmission torque Tac may be defined as torque transmitted from drive-side member 41 to countershaft 55 via gearbox 51 or torque transmitted to driven-side member 57b of transmission mechanism 57 via gearbox 51 and countershaft 55. In this case, actual torque obtaining section 11a considers the speed reduction ratio of gearbox 51 for calculating actual transmission torque Tac. More specifically, actual torque obtaining section 11a multiplies the difference between EG torque TEac and EG-side inertia torque TIac by the speed reduction ratio Mratio of gearbox 51 after clutch 40 is engaged. In the same manner, target torque obtaining section 11b multiplies the difference between post-completion EG torque TEfin and post-completion EG-side inertia torque TIfin by the speed reduction ratio Mratio of gearbox 51 after clutch 40 is engaged, in order to calculate target transmission torque Ttg.

In addition, in the above description, control unit 11 obtains actual transmission torque Tac and target transmission torque Ttg in separate processing steps, and obtains the command actuation amount of clutch actuator 14 based on the obtained actual transmission torque Tac and target transmission torque Ttg. However, for example, storage unit 12 may store in advance an expression that associates accelerator displacement Aop, engine speed Ωe, EG speed variation dΩe/dt, driven-side rotational speed variation dΩcl/dt, and clutch rotational speed difference Ωdiff with the command actuation amount. Thus, control unit 11 may substitute a detected value into the expression to directly calculate the command actuation amount.

Further, in the above description, the command actuation amount of clutch actuator 14 corresponds to torque deviation ΔT, and clutch actuator control section 11c actuates clutch actuator 14 by an amount corresponding to torque deviation ΔT. However, clutch actuator control section 11c may execute proportional integral derivative (PID) control, for example. Specifically, clutch actuator control section 11c calculates torque deviation ΔT, while calculating a differential value of the calculated torque deviation ΔT with respect to time. Clutch actuator control section 11c also calculates an integral value of the calculated torque deviation ΔT with respect to time. Then, clutch actuator control section 11c may calculate the command actuation amount based on torque deviation ΔT and based on the calculated differential value and integral value.

Still further, in the above-mentioned processing, target torque obtaining section 11b estimates the torque to be transmitted to driven-side member 42 after drive-side member 41 and driven-side member 42 are completely engaged, and defines the estimated torque as target transmission torque Ttg. However, target torque obtaining section 11b may set target transmission torque Ttg at a value depending on accelerator displacement Aop detected by accelerator operation detector 17, when the vehicle starts-up or is running at lower-speeds below a predetermined value. This processing is executed as follows, for example.

Storage unit 12 stores in advance a table (hereinafter referred to as target transmission torque table) that establishes correspondence between accelerator displacement Aop by the rider and target transmission torque Ttg. Then, target torque obtaining section 11b refers to the target transmission torque table to obtain the target transmission torque Ttg that corresponds to the accelerator displacement Aop detected based on the request torque signal. Alternatively, storage unit 12 may store an expression that represents the relationship between accelerator displacement Aop by the rider and target transmission torque Ttg. Thus, target torque obtaining section 11b may substitute the detected accelerator displacement Aop into the expression to obtain target transmission torque Ttg.

Figure 10:
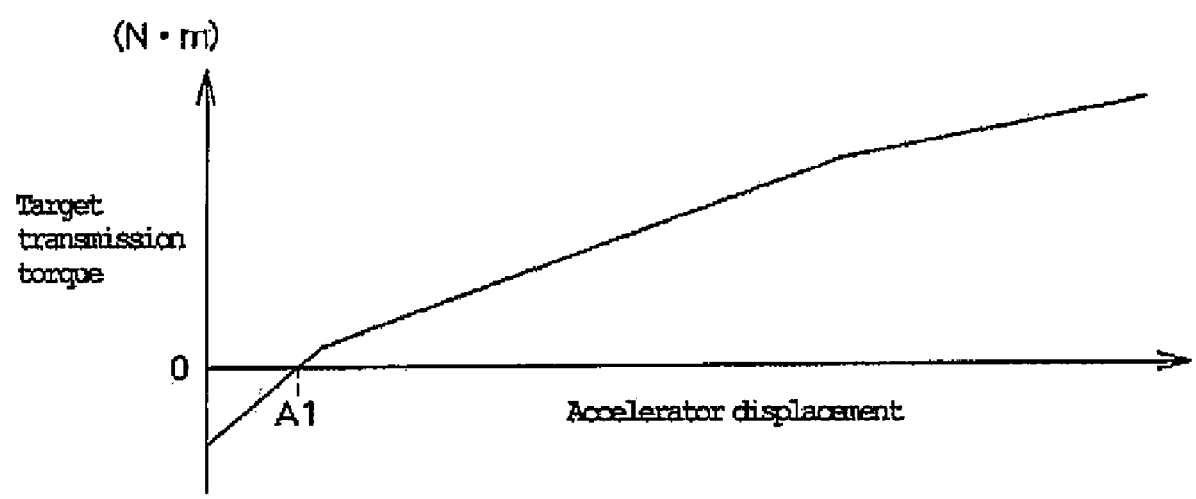
FIG. 10 is a graph showing the relationship between target transmission torque and an accelerator displacement.

FIG. 10 is a graph showing the relationship between accelerator displacement Aop and target transmission torque Ttg obtained from this processing. In FIG. 10, the horizontal axis represents accelerator displacement Aop, and the vertical axis represents target transmission torque Ttg. FIG. 10 shows that as accelerator displacement Aop increases, target transmission torque Ttg increases, accordingly. Also, when accelerator displacement Aop is lower than a predetermined value A1, target transmission torque Ttg is preset at a negative value.

Clutch actuator control section 11c then obtains the command actuation amount of clutch actuator 14 based on torque deviation ΔT or the difference between target transmission torque Ttg and actual transmission torque Tac obtained by actual torque obtaining section 11a. In this processing, for example, clutch actuator control section 11c refers to the aforementioned actuation amount relational expression to obtain the command actuation amount that corresponds to torque deviation ΔT.

As described above, clutch actuator 14 is capable of being actuated in the engagement direction to engage clutch 40 or in the disengagement direction to disengage clutch 40. Clutch actuator control section 11c actuates clutch actuator 14 in either of the directions determined based on torque deviation ΔT and clutch rotational speed difference Ωdiff. Specifically, under the operating condition that clutch rotational speed difference Ωdiff is positive (under the operating condition that the rotational speed of drive-side member 41 is higher than the rotational speed of driven-side member 42), if actual transmission torque Tac is lower than target transmission torque Ttg, clutch actuator control section 11c actuates clutch actuator 14 in the engagement direction. Thereby, actual transmission torque Tac increases, approximating target transmission torque Ttg. In other words, when clutch actuator 14 is actuated in the engagement direction under such operating condition, engine speed $\Omega e$ decreases. Generally, the engine output characteristics show that EG torque TEac increases as engine speed $\Omega e$ decreases. In addition, EG-side inertia torque TIac (TIac=I×d$\Omega$e/dt) is a negative value. Therefore, actual transmission torque Tac increases (see expression (1)), approximating target transmission torque Ttg. If actual transmission torque Tac exceeds target transmission torque Ttg under such operating condition, clutch actuator control section 11c actuates clutch actuator 14 in the disengagement direction. Thereby, actual transmission torque Tac decreases.

In contrast, under the operating condition that clutch rotational speed difference $\Omega$diff is negative (under the operating condition that the rotational speed of driven-side member 42 is higher than the rotational speed of drive-side member 41), if target transmission torque Ttg is lower than actual transmission torque Tac, clutch actuator control section 11c actuates clutch actuator 14 in the engagement direction. Thereby, actual transmission torque Tac decreases, approximating target transmission torque Ttg. Under such operating condition, when clutch actuator 14 is actuated in the engagement direction, engine speed $\Omega e$ increases in contrast to the aforementioned operating condition. In view of the engine output characteristics, EG torque TEac decreases as engine speed $\Omega e$ increases. In addition, EG-side inertia torque TIac is a positive value. Thus, actual transmission torque Tac decreases, approximating target transmission torque Ttg.

Figure 11:
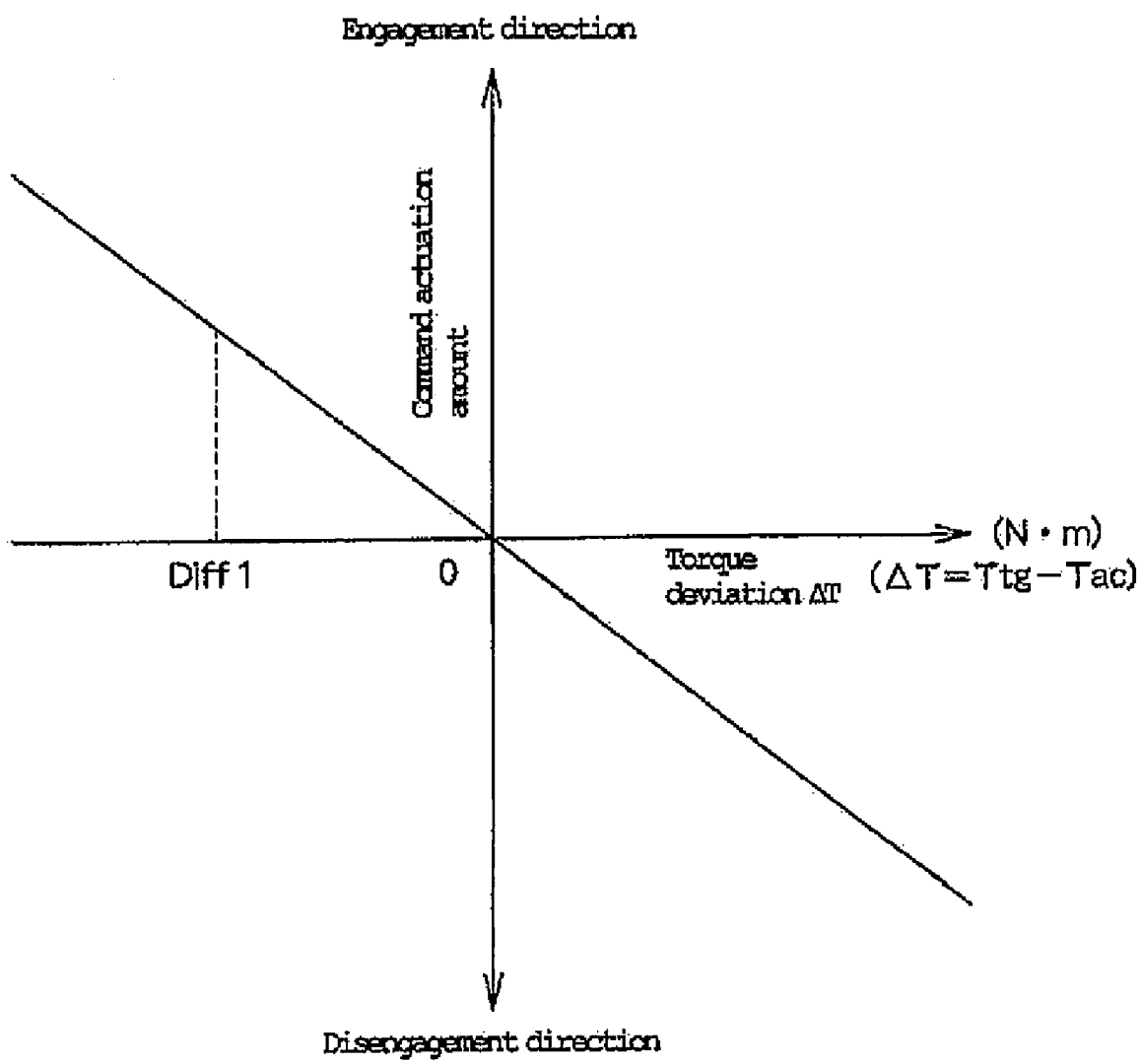
FIG. 11 is a graph showing the relationship between a command actuation amount represented by a disengagement actuation amount relational expression and a value obtained by subtracting actual transmission torque from target transmission torque.

This processing is executed as follows, for example. Clutch actuator control section 11c selectively uses either one of actuation amount relational expressions: One expression (hereinafter referred to as engagement actuation amount relational expression, for example, the expression representing the relationship shown in FIG. 6) is established such that the actuation amount of clutch actuator 14 increases in the engagement direction as torque deviation $\Delta T$ ($\Delta T$=Ttg−Tac) increases. The other expression (hereinafter referred to as disengagement actuation amount relational expression) is established such that the actuation amount of clutch actuator 14 increases in the disengagement direction as torque deviation $\Delta T$ increases. FIG. 11 is a graph showing the relationship between the command actuation amount represented by the disengagement actuation amount relational expression and torque deviation $\Delta T$. As shown in FIG. 11, in the disengagement actuation amount relational expression, the command actuation amount is preset such that if torque deviation $\Delta T$ is a negative value, clutch actuator 14 is actuated in the direction to engage clutch 40.

Then, clutch actuator control section 11c calculates clutch rotational speed difference $\Omega$diff based on the signals inputted from clutch rotational speed detectors 23a, 23b. If the calculated clutch rotational speed difference $\Omega$diff is a positive value (if the rotational speed of drive-side member 41 is higher than the rotational speed of driven-side member 42), clutch actuator control section 11c uses the engagement actuation amount relational expression to obtain the command actuation amount of clutch actuator 14. In contrast, if the calculated clutch rotational speed difference $\Omega$diff is a negative value, clutch actuator control section 11c uses the disengagement actuation amount relational expression to obtain the command actuation amount of clutch actuator 14.

Thereby, an engine brake is applied by the rider setting the accelerator displacement at close to zero at vehicle start-up. More specifically, in the target transmission torque table shown in FIG. 10, when accelerator displacement is zero, target transmission torque Ttg is a negative value. Thus, at vehicle start-up, if clutch 40 is disengaged and actual transmission torque Tac is zero, then torque deviation $\Delta T$ is a negative value. In turn, when the vehicle is running downslope, the rotational speed of driven-side member 42 can be higher than the rotational speed of drive-side member 41. In this case, clutch actuator control section 11c uses the disengagement actuation amount relational expression to obtain the command actuation amount, by which clutch actuator 14 is actuated in the engagement direction, based on the negative torque deviation $\Delta T$ (for example, Diff1 in FIG. 11) obtained by subtracting actual transmission torque Tac from target transmission torque Ttg. Consequently, an engine brake is applied.

Alternatively, the processing for obtaining the command actuation amount in such a manner by selectively using either the engagement or disengagement actuation amount relational expression, depending on whether the clutch rotational speed difference $\Omega$diff is positive or negative, may be executed in the aforementioned processing executed at gear shifting. Thereby, when the accelerator displacement is small even at gear shifting and clutch rotational speed difference $\Omega$diff is negative, an engine brake is applied.

Further alternatively, clutch actuator control section 11c may select either one of the engagement and disengagement actuation amount relational expressions based on the rotational speed of the mechanism upstream of drive-side member 41 (for example, engine speed $\Omega e$) and based on the rotational speed of the downstream transmission mechanism downstream of driven-side member 42, rather than based on clutch rotational speed difference $\Omega$diff. For example, clutch actuator control section 11c may compare a value, which is obtained by multiplying engine speed $\Omega e$ by the speed reduction ratio Pratio of primary speed reducing mechanism 36, with a value, which is obtained by multiplying the vehicle speed by the speed reduction ratios of gearbox 51 and transmission mechanism 57, and based on the comparison result, may determine whether or not clutch rotational speed difference $\Omega$diff is positive or negative.

Figure 12:
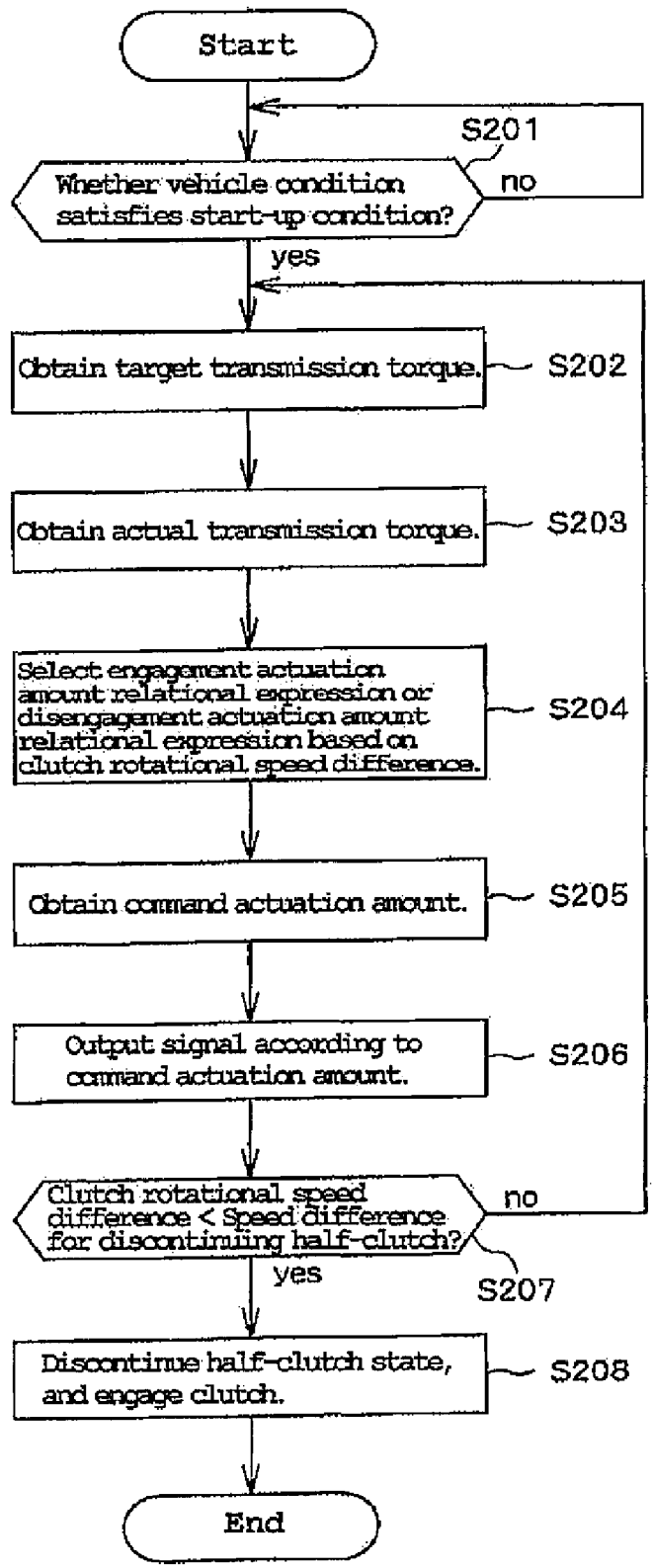
FIG. 12 is a flowchart showing another example of processing steps executed by the control unit.

The processing flow executed by control unit 11 is now described. FIG. 12 is a flowchart showing an example of the processing executed by control unit 11 according to an embodiment of the invention. Here, the processing at vehicle start-up is described as an example.

Control unit 11 determines whether or not the vehicle conditions satisfy predetermined start-up conditions (S201). The start-up conditions are that for example, clutch 40 is disengaged, with gearbox 51 set in a position other than neutral position; and engine speed $\Omega e$ and accelerator displacement Aop are equal to or greater than their respective predetermined values. Alternatively, the start-up conditions may be that clutch 40 is disengaged with gearbox 51 set in a position other than neutral position; and a value, which is obtained by subtracting the rotational speed of driven-side member 42 from the rotational speed of drive-side member 41 of clutch 40, is a negative value. Continuation of these conditions for a given time period or longer may also be a predetermined start-up condition.

In step S201, if the vehicle conditions satisfy the start-up conditions, target torque obtaining section 11b detects accelerator displacement Aop based on the request torque signal of accelerator operation detector 17, and refers to the aforementioned target transmission torque table to obtain target transmission torque Ttg that corresponds to accelerator displacement Aop (S202).

In turn, actual torque obtaining section 11a obtains actual transmission torque Tac currently transmitted from drive-side member 41 to driven-side member 42 (step S203). Further, clutch actuator control section 11c calculates clutch rotational speed difference Ωdiff based on signals inputted from clutch rotational speed detectors 23a, 23b. Depending on a positive or negative value of the calculated clutch rotational speed difference Ωdiff, clutch actuator control section 11c selects one of the engagement and disengagement actuation amount relational expressions (step S204).

Clutch actuator control section 11c then obtains the command actuation amount based on clutch rotational speed difference Ωdiff and torque deviation ΔT (S205). Specifically, if clutch rotational speed difference Ωdiff is negative, clutch actuator control section 11c substitutes torque deviation ΔT into the disengagement actuation amount relational expression in order to obtain the command actuation amount. In contrast, if clutch rotational speed difference Ωdiff is positive, clutch actuator control section 11c substitutes torque deviation ΔT into the engagement actuation amount relational expression in order to obtain the command actuation amount. Then, clutch actuator control section 11c outputs a signal to clutch actuator drive circuit 15 according to the command actuation amount (S206). This allows clutch 40, which has been disengaged, to be in a half-clutch state.

Next, clutch actuator control section 11c calculates clutch rotational speed difference Ωdiff based on signals inputted from clutch rotational speed detectors 23a, 23b, and determines whether or not the calculated clutch rotational speed difference Ωdiff is smaller than the speed difference for discontinuing half-clutch (S207). If clutch rotational speed difference Ωdiff is equal to or greater than the speed difference for discontinuing half-clutch, control unit 11 returns to step S202 to execute the subsequent processing steps again. Then, when clutch 40 is in a half-clutch state, control unit 11 executes steps S202-S206 in a predetermined cycle. This allows actual transmission torque Tac to follow target transmission torque Ttg, so that the rider can obtain acceleration as required. In contrast, in the determination in step S207, if clutch rotational speed difference Ωdiff is smaller than the speed difference for discontinuing half-clutch, clutch actuator control section 11c actuates clutch actuator 14 to completely engage drive-side member 41 with driven-side member 42 and discontinue the half-clutch state of clutch 40 (S208). The aforementioned processing is an example of the processing executed by control unit 11 at vehicle start-up.

In the above-mentioned clutch controller 10, target torque obtaining section 11b obtains target transmission torque Ttg according to accelerator displacement Aop. This allows torque to be transmitted to axle 3a according to the rider's request, even when drive-side member 41 and driven-side member 42 are subjected to wear-out or thermal expansion, so that operability of the vehicle improves particularly at vehicle start-up and low-speed running.

Motorcycle 1 is provided with engine 30 as a driving source. Alternatively, the driving source may be an electric motor or a hybrid engine combining an electric motor and an engine.

In addition, in the above description, clutch controller 10 and clutch 40 apply to motorcycle 1. However, the above-mentioned clutch controller may apply to other vehicles such as four-wheeled automobiles having a mechanical clutch or machinery that outputs torque, outputted from the driving source, via the mechanical clutch to run constantly (for example, industrial machinery and agricultural machinery).

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A clutch controller for controlling an engagement state of a clutch by actuating an actuator, comprising:
    a target torque obtaining means for obtaining torque that is supposed to be transmitted from a drive-side member of the clutch to a downstream mechanism in a torque transmission path as target transmission torque, the downstream mechanism including a driven-side member of the clutch; and
    a control means for actuating the actuator based on the target transmission torque,
    wherein the target torque obtaining means estimates torque to be transmitted from the drive-side member to the downstream mechanism in the torque transmission path after the drive-side member and the driven-side member are completely engaged, and obtains the estimated torque as the target transmission torque.

2. The clutch controller according to claim 1, wherein the target torque obtaining means estimates torque to be outputted from a power source after the drive-side member and the driven-side member are completely engaged and inertia torque to be produced on a mechanism upstream of the drive-side member in the torque transmission path after the drive-side member and the driven-side member are completely engaged, and based on the estimated torque and inertial torque, estimates the torque to be transmitted to the downstream mechanism after the drive-side member and the driven-side member are completely engaged.

3. The clutch controller according to claim 1, further comprising an actual torque obtaining means for obtaining torque transmitted from the drive-side member to the downstream mechanism in the torque transmission path as actual transmission torque, wherein the control means actuates the actuator based on a difference between the actual transmission torque and the target transmission torque.

4. The clutch controller according to claim 3, wherein the actual torque obtaining means obtains the actual transmission torque based on torque outputted from a power source and inertia torque produced on a mechanism upstream of the drive-side member in the torque transmission path.

5. The clutch controller according to claim 1, wherein the control means actuates the actuator such that when the clutch is in a half-clutch state, an actual torque transmitted from the drive-side member to the downstream mechanism in the torque transmission path approximates the target transmission torque.

6. The clutch controller according to claim 5, wherein the actual transmission torque does not change at the time when the clutch changes from the half-clutch state to being completely engaged.

7. A straddle-type vehicle comprising:
    a power source;
    a clutch for transmitting torque of the power source or interrupting transmission of the torque; and
    a clutch controller for controlling an engagement state of the clutch by actuating an actuator, wherein the clutch controller comprises:
        a target torque obtaining means for obtaining torque that is supposed to be transmitted from a drive-side member of the clutch to a downstream mechanism in a torque transmission path as target transmission torque, the downstream mechanism including a driven-side member of the clutch; and a control means for actuating the actuator based on the target transmission torque, and wherein the target torque obtaining means estimates torque to be transmitted from the drive-side member to the downstream mechanism in the torque transmission path after the drive-side member and the driven-side member are completely engaged, and obtains the estimated torque as the target transmission torque.

8. The straddle-type vehicle according to claim 7, wherein the control means actuates the actuator such that when the clutch is in a half-clutch state, an actual torque transmitted from the drive-side member to the downstream mechanism in the torque transmission path approximates the target transmission torque.

9. The straddle-type vehicle according to claim 8, wherein the actual transmission torque does not change at the time when the clutch changes from the half-clutch state to being completely engaged.

10. A method of controlling a clutch for controlling an engagement state of the clutch by actuating an actuator, the method comprising the steps of:
   estimating torque to be transmitted from a drive-side member of the clutch to a downstream mechanism in a torque transmission path after the drive-side member and a driven-side member of the clutch are completely engaged, the downstream mechanism including the driven-side member;
   obtaining the estimated torque as target transmission torque or torque that is supposed to be transmitted from the drive-side member to the downstream mechanism in the torque transmission path; and
   actuating the actuator based on the target transmission torque.

11. The method according to claim 10, wherein actuating the actuator includes controlling the actuator such that when the clutch is in a half-clutch state, an actual torque transmitted from the drive-side member to the downstream mechanism in the torque transmission path approximates the target transmission torque.

12. The method according to claim 11, wherein actuating the actuator further includes controlling the actuator such that the actual transmission torque does not change at the time when the clutch changes from the half-clutch state to being completely engaged.

* * * * *